United States Patent
Haq et al.

(10) Patent No.: US 9,628,507 B2
(45) Date of Patent: Apr. 18, 2017

(54) ADVANCED PERSISTENT THREAT (APT) DETECTION CENTER

(71) Applicant: FireEye, Inc., Milpitas, CA (US)

(72) Inventors: Thoufique Haq, Sunnyvale, CA (US); Jinjian Zhai, Union City, CA (US); Vinay K. Pidathala, San Jose, CA (US)

(73) Assignee: FireEye, Inc., Milpitas, CA (US)

( * ) Notice: Subject to any disclaimer, the term of this patent is extended or adjusted under 35 U.S.C. 154(b) by 97 days.

(21) Appl. No.: 14/042,483

(22) Filed: Sep. 30, 2013

(65) Prior Publication Data

US 2015/0096024 A1    Apr. 2, 2015

(51) Int. Cl.
G06F 21/56    (2013.01)
H04L 29/06    (2006.01)
G06F 21/55    (2013.01)

(52) U.S. Cl.
CPC .......... *H04L 63/145* (2013.01); *G06F 21/552* (2013.01); *G06F 21/56* (2013.01); *H04L 63/1416* (2013.01)

(58) Field of Classification Search
CPC . H04L 63/1416; H04L 63/144; H04L 63/145; H04L 2463/144; H04L 63/1425; G06F 21/564; Y10S 707/99944
See application file for complete search history.

(56) References Cited

U.S. PATENT DOCUMENTS 4,292,580 A    9/1981 Ott et al.
5,175,732 A    12/1992 Hendel et al.
5,440,723 A    8/1995 Arnold et al.
5,490,249 A    2/1996 Miller
5,657,473 A    8/1997 Killean et al.
(Continued)

FOREIGN PATENT DOCUMENTS

GB    2439806       1/2008
GB    2490431 A    10/2012
(Continued)

OTHER PUBLICATIONS

*IEEE Xplore Digital Library Sear Results for "detection of unknown computer worms"*. Http//ieeexplore.ieee.org/searchresult.jsp?SortField=Score&SortOrder=desc&ResultC . . . , (Accessed on Aug. 28, 2009).
(Continued)

*Primary Examiner* — Saleh Najjar
*Assistant Examiner* — Shu Chun Gao
(74) *Attorney, Agent, or Firm* — Rutan & Tucker, LLP

(57) ABSTRACT

A computerized method is described in which one or more received objects are analyzed by an advanced persistent threat (APT) detection center to determine if the objects are APTs. The analysis may include the extraction of features describing and characterizing features of the received objects. The extracted features may be compared with features of known APT malware objects and known non-APT malware objects to determine a classification or probability of the received objects being APT malware. Upon determination that the received objects are APT malware, warning messages may be transmitted to a user of associated client devices. Classified objects may also be used to generate analytic data for the prediction and prevention of future APT attacks.

35 Claims, 11 Drawing Sheets

(56) References Cited

U.S. PATENT DOCUMENTS

| | | | |
|---|---|---|---|
| 5,842,002 | A | 11/1998 | Schnurer et al. |
| 5,978,917 | A | 11/1999 | Chi |
| 6,088,803 | A | 7/2000 | Tso et al. |
| 6,094,677 | A | 7/2000 | Capek et al. |
| 6,108,799 | A | 8/2000 | Boulay et al. |
| 6,118,382 | A | 9/2000 | Hibbs et al. |
| 6,269,330 | B1 | 7/2001 | Cidon et al. |
| 6,272,641 | B1 | 8/2001 | Ji |
| 6,279,113 | B1 | 8/2001 | Vaidya |
| 6,298,445 | B1 | 10/2001 | Shostack |
| 6,357,008 | B1 | 3/2002 | Nachenberg |
| 6,417,774 | B1 | 7/2002 | Hibbs et al. |
| 6,424,627 | B1 | 7/2002 | Sorhaug et al. |
| 6,442,696 | B1 | 8/2002 | Wray et al. |
| 6,484,315 | B1 | 11/2002 | Ziese |
| 6,487,666 | B1 | 11/2002 | Shanklin et al. |
| 6,493,756 | B1 | 12/2002 | O'Brien et al. |
| 6,550,012 | B1 | 4/2003 | Villa et al. |
| 6,700,497 | B2 | 3/2004 | Hibbs et al. |
| 6,775,657 | B1 | 8/2004 | Baker |
| 6,831,893 | B1 | 12/2004 | Ben Nun et al. |
| 6,832,367 | B1 | 12/2004 | Choi et al. |
| 6,895,550 | B2 | 5/2005 | Kanchirayappa et al. |
| 6,898,632 | B2 | 5/2005 | Gordy et al. |
| 6,907,396 | B1 | 6/2005 | Muttik et al. |
| 6,941,348 | B2 | 9/2005 | Petry et al. |
| 6,971,097 | B1 | 11/2005 | Wallman |
| 6,981,279 | B1 | 12/2005 | Arnold et al. |
| 6,995,665 | B2 | 2/2006 | Appelt et al. |
| 7,007,107 | B1 | 2/2006 | Ivchenko et al. |
| 7,028,179 | B2 | 4/2006 | Anderson et al. |
| 7,043,757 | B2 | 5/2006 | Hoefelmeyer et al. |
| 7,069,316 | B1 | 6/2006 | Gryaznov |
| 7,080,407 | B1 | 7/2006 | Zhao et al. |
| 7,080,408 | B1 | 7/2006 | Pak et al. |
| 7,093,002 | B2 | 8/2006 | Wolff et al. |
| 7,093,239 | B1 | 8/2006 | van der Made |
| 7,096,498 | B2 | 8/2006 | Judge |
| 7,100,201 | B2 | 8/2006 | Izatt |
| 7,107,617 | B2 | 9/2006 | Hursey et al. |
| 7,159,149 | B2 | 1/2007 | Spiegel et al. |
| 7,213,260 | B2 | 5/2007 | Judge |
| 7,231,667 | B2 | 6/2007 | Jordan |
| 7,240,364 | B1 | 7/2007 | Branscomb et al. |
| 7,240,368 | B1 | 7/2007 | Roesch et al. |
| 7,243,371 | B1 | 7/2007 | Kasper et al. |
| 7,249,175 | B1 | 7/2007 | Donaldson |
| 7,287,278 | B2 | 10/2007 | Liang |
| 7,308,716 | B2 | 12/2007 | Danford et al. |
| 7,328,453 | B2 | 2/2008 | Merkle, Jr. et al. |
| 7,346,486 | B2 | 3/2008 | Ivancic et al. |
| 7,356,736 | B2 | 4/2008 | Natvig |
| 7,386,888 | B2 | 6/2008 | Liang et al. |
| 7,392,542 | B2 | 6/2008 | Bucher |
| 7,398,553 | B1 * | 7/2008 | Li .................. G06F 21/566 713/189 |
| 7,418,729 | B2 | 8/2008 | Szor |
| 7,428,300 | B1 | 9/2008 | Drew et al. |
| 7,441,272 | B2 | 10/2008 | Durham et al. |
| 7,448,084 | B1 | 11/2008 | Apap et al. |
| 7,458,098 | B2 | 11/2008 | Judge et al. |
| 7,464,404 | B2 | 12/2008 | Carpenter et al. |
| 7,464,407 | B2 | 12/2008 | Nakae et al. |
| 7,467,408 | B1 | 12/2008 | O'Toole, Jr. |
| 7,478,428 | B1 | 1/2009 | Thomlinson |
| 7,480,773 | B1 | 1/2009 | Reed |
| 7,487,543 | B2 | 2/2009 | Arnold et al. |
| 7,496,960 | B1 | 2/2009 | Chen et al. |
| 7,496,961 | B2 | 2/2009 | Zimmer et al. |
| 7,519,990 | B1 | 4/2009 | Xie |
| 7,523,493 | B2 | 4/2009 | Liang et al. |
| 7,530,104 | B1 | 5/2009 | Thrower et al. |
| 7,540,025 | B2 | 5/2009 | Tzadikario |
| 7,565,550 | B2 | 7/2009 | Liang et al. |
| 7,568,233 | B1 | 7/2009 | Szor et al. |
| 7,584,455 | B2 | 9/2009 | Ball |
| 7,603,715 | B2 | 10/2009 | Costa et al. |
| 7,607,171 | B1 | 10/2009 | Marsden et al. |
| 7,639,714 | B2 | 12/2009 | Stolfo et al. |
| 7,644,441 | B2 | 1/2010 | Schmid et al. |
| 7,657,419 | B2 | 2/2010 | van der Made |
| 7,676,841 | B2 | 3/2010 | Sobchuk et al. |
| 7,698,548 | B2 | 4/2010 | Shelest et al. |
| 7,707,633 | B2 | 4/2010 | Danford et al. |
| 7,712,136 | B2 | 5/2010 | Sprosts et al. |
| 7,730,011 | B1 | 6/2010 | Deninger et al. |
| 7,739,740 | B1 | 6/2010 | Nachenberg et al. |
| 7,779,463 | B2 | 8/2010 | Stolfo et al. |
| 7,784,097 | B1 | 8/2010 | Stolfo et al. |
| 7,832,008 | B1 | 11/2010 | Kraemer |
| 7,836,502 | B1 | 11/2010 | Zhao et al. |
| 7,849,506 | B1 | 12/2010 | Dansey et al. |
| 7,854,007 | B2 | 12/2010 | Sprosts et al. |
| 7,869,073 | B2 | 1/2011 | Oshima |
| 7,877,803 | B2 | 1/2011 | Enstone et al. |
| 7,904,959 | B2 | 3/2011 | Sidiroglou et al. |
| 7,908,660 | B2 | 3/2011 | Bahl |
| 7,930,738 | B1 | 4/2011 | Petersen |
| 7,937,761 | B1 | 5/2011 | Benett |
| 7,949,849 | B2 | 5/2011 | Lowe et al. |
| 7,996,556 | B2 | 8/2011 | Raghavan et al. |
| 7,996,836 | B1 | 8/2011 | McCorkendale et al. |
| 7,996,904 | B1 | 8/2011 | Chiueh et al. |
| 7,996,905 | B2 | 8/2011 | Arnold et al. |
| 8,006,305 | B2 | 8/2011 | Aziz |
| 8,010,667 | B2 | 8/2011 | Zhang et al. |
| 8,020,206 | B2 | 9/2011 | Hubbard et al. |
| 8,028,338 | B1 | 9/2011 | Schneider et al. |
| 8,042,184 | B1 | 10/2011 | Batenin |
| 8,045,094 | B2 | 10/2011 | Teragawa |
| 8,045,458 | B2 | 10/2011 | Alperovitch et al. |
| 8,069,484 | B2 | 11/2011 | McMillan et al. |
| 8,087,086 | B1 | 12/2011 | Lai et al. |
| 8,171,553 | B2 | 5/2012 | Aziz et al. |
| 8,176,049 | B2 | 5/2012 | Deninger et al. |
| 8,176,480 | B1 | 5/2012 | Spertus |
| 8,201,246 | B1 | 6/2012 | Wu et al. |
| 8,204,984 | B1 | 6/2012 | Aziz et al. |
| 8,214,905 | B1 | 7/2012 | Doukhvalov et al. |
| 8,220,055 | B1 | 7/2012 | Kennedy |
| 8,225,288 | B2 | 7/2012 | Miller et al. |
| 8,225,373 | B2 | 7/2012 | Kraemer |
| 8,233,882 | B2 | 7/2012 | Rogel |
| 8,234,640 | B1 | 7/2012 | Fitzgerald et al. |
| 8,234,709 | B2 | 7/2012 | Viljoen et al. |
| 8,239,944 | B1 | 8/2012 | Nachenberg et al. |
| 8,260,914 | B1 | 9/2012 | Ranjan |
| 8,266,091 | B1 | 9/2012 | Gubin et al. |
| 8,286,251 | B2 | 10/2012 | Eker et al. |
| 8,291,499 | B2 | 10/2012 | Aziz et al. |
| 8,307,435 | B1 | 11/2012 | Mann et al. |
| 8,307,443 | B2 | 11/2012 | Wang et al. |
| 8,312,545 | B2 | 11/2012 | Tuvell et al. |
| 8,321,936 | B1 | 11/2012 | Green et al. |
| 8,321,941 | B2 | 11/2012 | Tuvell et al. |
| 8,332,571 | B1 | 12/2012 | Edwards, Sr. |
| 8,365,286 | B2 | 1/2013 | Poston |
| 8,365,297 | B1 | 1/2013 | Parshin et al. |
| 8,370,938 | B1 | 2/2013 | Daswani et al. |
| 8,370,939 | B2 | 2/2013 | Zaitsev et al. |
| 8,375,444 | B2 | 2/2013 | Aziz et al. |
| 8,381,299 | B2 | 2/2013 | Stolfo et al. |
| 8,402,529 | B1 | 3/2013 | Green et al. |
| 8,464,340 | B2 | 6/2013 | Ahn et al. |
| 8,479,174 | B2 | 7/2013 | Chiriac |
| 8,479,276 | B1 | 7/2013 | Vaystikh et al. |
| 8,479,291 | B1 | 7/2013 | Bodke |
| 8,510,827 | B1 | 8/2013 | Leake et al. |
| 8,510,828 | B1 | 8/2013 | Guo et al. |
| 8,510,842 | B2 | 8/2013 | Amit et al. |
| 8,516,478 | B1 | 8/2013 | Edwards et al. |
| 8,516,590 | B1 * | 8/2013 | Ranadive ........... H04L 63/1483 713/187 |
| 8,516,593 | B2 | 8/2013 | Aziz |

(56) References Cited

U.S. PATENT DOCUMENTS

| | | |
|---|---|---|
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,946 B1 | 10/2013 | Aziz et al. |
| 8,584,094 B2 | 11/2013 | Dahdia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,769,692 B1 * | 7/2014 | Muttik .............. H04L 63/1416 726/22 |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,282 B1 | 11/2014 | Aziz et al. |
| 8,898,788 B1 | 11/2014 | Aziz et al. |
| 8,904,531 B1 * | 12/2014 | Saklikar .............. G06F 21/552 707/695 |
| 8,935,779 B2 | 1/2015 | Manni et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,694 B2 | 8/2015 | Aziz et al. |
| 9,118,715 B2 | 8/2015 | Staniford et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland, III |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | Van Der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0044912 A1 * | 3/2004 | Connary et al. .............. 713/201 |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |

(56) References Cited

U.S. PATENT DOCUMENTS

| | | |
|---|---|---|
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240217 A1* | 10/2007 | Tuvell .................... G06F 21/56 726/24 |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0010683 A1* | 1/2008 | Baddour ........... G06F 17/30864 726/24 |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0133540 A1* | 6/2008 | Hubbard ............... H04L 63/101 |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0181227 A1 | 7/2008 | Todd |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1* | 7/2009 | Poston ................. G06F 21/564 726/24 |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0023118 A1* | 1/2011 | Wright .................. G06F 11/28 726/23 |
| 2011/0025504 A1 | 2/2011 | Lyon et al. |
| 2011/0041179 A1 | 2/2011 | Stahlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0110667 A1 | 5/2012 | Zubrilin et al. |

(56) References Cited

U.S. PATENT DOCUMENTS

| | | | |
|---|---|---|---|
| 2012/0117652 A1 | 5/2012 | Manni et al. | |
| 2012/0121154 A1 | 5/2012 | Xue et al. | |
| 2012/0124426 A1 | 5/2012 | Maybee et al. | |
| 2012/0159620 A1* | 6/2012 | Seifert | H04L 63/1416 726/22 |
| 2012/0174186 A1 | 7/2012 | Aziz et al. | |
| 2012/0174196 A1 | 7/2012 | Bhogavilli et al. | |
| 2012/0174218 A1 | 7/2012 | McCoy et al. | |
| 2012/0198279 A1 | 8/2012 | Schroeder | |
| 2012/0210423 A1 | 8/2012 | Friedrichs et al. | |
| 2012/0222121 A1 | 8/2012 | Staniford et al. | |
| 2012/0240185 A1* | 9/2012 | Kapoor | H04L 63/1425 726/1 |
| 2012/0255015 A1 | 10/2012 | Sahita et al. | |
| 2012/0255017 A1 | 10/2012 | Sallam | |
| 2012/0260342 A1* | 10/2012 | Dube | G06F 21/564 726/24 |
| 2012/0266244 A1 | 10/2012 | Green et al. | |
| 2012/0278886 A1 | 11/2012 | Luna | |
| 2012/0297489 A1 | 11/2012 | Dequevy | |
| 2012/0330801 A1 | 12/2012 | McDougal et al. | |
| 2013/0014259 A1 | 1/2013 | Gribble et al. | |
| 2013/0036472 A1 | 2/2013 | Aziz | |
| 2013/0047257 A1 | 2/2013 | Aziz | |
| 2013/0074185 A1 | 3/2013 | McDougal et al. | |
| 2013/0086684 A1 | 4/2013 | Mohler | |
| 2013/0097699 A1 | 4/2013 | Balupari et al. | |
| 2013/0097706 A1* | 4/2013 | Titonis et al. | 726/24 |
| 2013/0111587 A1 | 5/2013 | Goel et al. | |
| 2013/0117852 A1* | 5/2013 | Stute | H04L 63/1425 726/23 |
| 2013/0117855 A1 | 5/2013 | Kim et al. | |
| 2013/0139264 A1 | 5/2013 | Brinkley et al. | |
| 2013/0160125 A1 | 6/2013 | Likhachev et al. | |
| 2013/0160127 A1 | 6/2013 | Jeong et al. | |
| 2013/0160130 A1 | 6/2013 | Mendelev et al. | |
| 2013/0160131 A1 | 6/2013 | Madou et al. | |
| 2013/0167236 A1 | 6/2013 | Sick | |
| 2013/0174214 A1 | 7/2013 | Duncan | |
| 2013/0185789 A1 | 7/2013 | Hagiwara et al. | |
| 2013/0185795 A1 | 7/2013 | Winn et al. | |
| 2013/0185798 A1 | 7/2013 | Saunders et al. | |
| 2013/0191915 A1 | 7/2013 | Antonakakis et al. | |
| 2013/0196649 A1 | 8/2013 | Paddon et al. | |
| 2013/0227691 A1 | 8/2013 | Aziz et al. | |
| 2013/0246370 A1 | 9/2013 | Bartram et al. | |
| 2013/0263260 A1 | 10/2013 | Mahaffey et al. | |
| 2013/0291109 A1 | 10/2013 | Staniford et al. | |
| 2013/0298243 A1 | 11/2013 | Kumar et al. | |
| 2013/0298244 A1* | 11/2013 | Kumar | G06F 21/52 726/25 |
| 2013/0305357 A1* | 11/2013 | Ayyagari | H04L 63/14 726/22 |
| 2014/0053260 A1 | 2/2014 | Gupta et al. | |
| 2014/0053261 A1 | 2/2014 | Gupta et al. | |
| 2014/0130158 A1 | 5/2014 | Wang et al. | |
| 2014/0137180 A1 | 5/2014 | Lukacs et al. | |
| 2014/0169762 A1 | 6/2014 | Ryu | |
| 2014/0179360 A1 | 6/2014 | Jackson et al. | |
| 2014/0328204 A1 | 11/2014 | Klotsche et al. | |
| 2014/0337836 A1 | 11/2014 | Ismael | |
| 2014/0351935 A1 | 11/2014 | Shao et al. | |
| 2015/0096025 A1 | 4/2015 | Ismael | |

FOREIGN PATENT DOCUMENTS

| | | |
|---|---|---|
| WO | WO-02/06928 | 1/2002 |
| WO | WO-02/23805 | 3/2002 |
| WO | WO-2007-117636 | 10/2007 |
| WO | WO-2008/041950 | 4/2008 |
| WO | WO-2011/084431 | 7/2011 |
| WO | 2011/112348 A1 | 9/2011 |
| WO | 2012/075336 A1 | 6/2012 |
| WO | WO-2012/145066 | 10/2012 |
| WO | 2013/067505 A1 | 5/2013 |

OTHER PUBLICATIONS

AltaVista Advanced Search Results. "Event Orchestrator". Http://www.altavista.com/web/results?Itag=ody&pg=aq &aqmode=aqa=Event+Orchesrator . . . , (Accessed on Sep. 3, 2009).

AltaVista Advanced Search Results. "attack vector identifier". Http://www.altavista.com/web/results?Itag=ody&pg=aq &aqmode=aqa=Event+Orchestrator . . . , (Accessed on Sep. 15, 2009).

Cisco, Configuring the Catalyst Switched Port Analyzer (SPAN) ("Cisco"), (1992-2003).

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems(Feb. 2, 2005) "Sailer".

Excerpt regarding First Printing Date for Merike Kaeo, Designing Network Security ("Kaeo"), (2005).

The Sniffers's Guide to Raw Traffic available at: yuba.stanford.edu/~casado/pcap/section1.html, (Jan. 6, 2014).

NetBIOS Working Group. Protocol Standard for a NetBIOS Service on a TCP/UDP transport: Concepts and Methods. STD 19, RFC 1001, Mar. 1987.

"Network Security: NetDetector—Network Intrusion Forensic System (NIFS) Whitepaper", ("NetDetector Whitepaper"), (2003).

"Packet", Microsoft Computer Dictionary, Microsoft Press, (Mar. 2002), 1 page.

"When Virtual is Better Than Real", IEEEXplore Digital Library, available at, http://ieeexplore.ieee.org/xpl/articleDetails.jsp?reload=true&arnumber=990073.

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye") (Sep. 2003).

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Cohen, M.I. , "PyFlag—An advanced network forensic framework", Digital investigation 5, Elsevier, (2008), pp. S112-S120.

Costa, M. , et al., "Vigilante: End-to-End Containment of Internet Worms", SOSP '05, Association for Computing Machinery, Inc., Brighton U.K., (Oct. 23-26, 2005).

Crandall, J.R. , et al., "Minos:Control Data Attack Prevention Orthogonal to Memory Model", 37th International Symposium on Microarchitecture, Portland, Oregon, (Dec. 2004).

Deutsch, P. , "Zlib compressed data format specification version 3.3" RFC 1950, (1996).

Distler, "Malware Analysis: An Introduction", SANS Institute InfoSec Reading Room, SANS Institute, (2007).

Dunlap, George W. et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

(56) References Cited

OTHER PUBLICATIONS

Filiol, Eric , et al., "Combinatorial Optimisation of Worm Propagation on an Unknown Network", International Journal of Computer Science 2.2 (2007).
Goel, et al., *Reconstructing System State for Intrusion Analysis, Apr. 2008 SIGOPS Operating Systems Review*, vol. 42 Issue 3, pp. 21-28.
Hjelmvik, Erik , "Passive Network Security Analysis with NetworkMiner", (*IN*)*Secure*, Issue 18, (Oct. 2008), pp. 1-100.
Kaeo, Merike , "Designing Network Security", ("*Kaeo*"), (Nov. 2003).
Kim, H. , et al., "Autograph: Toward Automated, Distributed Worm Signature Detection", *Proceedings of the 13th Usenix Security Symposium* (*Security 2004*), San Diego, (Aug. 2004), pp. 271-286.
King, Samuel T., et al., "Operating System Support for Virtual Machines", ("*King*").
Krasnyansky, Max , et al., *Universal TUN/TAP driver*, available at https://www.kernel.org/doc/Documentation/networking/tuntap.txt (2002) ("*Krasnyansky*").
Kreibich, C. , et al., "Honeycomb-Creating Intrusion Detection Signatures Using Honeypots", *2nd Workshop on Hot Topics in Networks* (*HotNets-11*), Boston, USA, (2003).
Kristoff, J. , "Botnets, Detection and Mitigation: DNS-Based Techniques", *NU Security Day*, (2005), 23 pages.
Liljenstam, Michael , et al., "Simulating Realistic Network Traffic for Worm Warning System Design and Testing", *Institute for Security Technology studies*, Dartmouth College, ("Liljenstam"), (Oct. 27, 2003).
Marchette, David J., "Computer Intrusion Detection and Network Monitoring: A Statistical Viewpoint", ("*Marchette*"), (2001).
Margolis, P.E. , "Random House Webster's 'Computer & Internet Dictionary 3rd Edition'", ISBN 0375703519, (Dec. 1998).
Moore, D. , et al., "Internet Quarantine: Requirements for Containing Self-Propagating Code", *INFOCOM*, vol. 3, (Mar. 30-Apr. 3, 2003), pp. 1901-1910.
Morales, Jose A., et al., ""Analyzing and exploiting network behaviors of malware."", *Security and Privacy in Communication Networks*. Springer Berlin Heidelberg, 2010. 20-34.
Natvig, Kurt , "SANDBOXII: Internet", *Virus Bulletin Conference*, ("Natvig"), (Sep. 2002).
Newsome, J. , et al., "Dynamic Taint Analysis for Automatic Detection, Analysis, and Signature Generation of Exploits on Commodity Software", *In Proceedings of the 12th Annual Network and Distributed System Security, Symposium* (*NDSS '05*), (Feb. 2005).
Newsome, J. , et al., "Polygraph: Automatically Generating Signatures for Polymorphic Worms", *In Proceedings of the IEEE Symposium on Security and Privacy*, (May 2005).
Nojiri, D. , et al., "Cooperation Response Strategies for Large Scale Attack Mitigation", *DARPA Information Survivability Conference and Exposition*, vol. 1, (Apr. 22-24, 2003), pp. 293-302.
Peter M. Chen, and Brian D. Noble , "When Virtual Is Better Than Real, Department of Electrical Engineering and Computer Science", *University of Michigan* ("*Chen*").
Silicon Defense, "Worm Containment in the Internal Network", (Mar. 2003), pp. 1-25.
Singh, S. , et al., "Automated Worm Fingerprinting", *Proceedings of the ACM/USENIX Symposium on Operating System Design and Implementation*, San Francisco, California, (Dec. 2004).
Spitzner, Lance , "Honeypots: Tracking Hackers", ("*Spizner*"), (Sep. 17, 2002).
Thomas H. Ptacek, and Timothy N. Newsham , "Insertion, Evasion, and Denial of Service: Eluding Network Intrusion Detection", *Secure Networks*, ("Ptacek"), (Jan. 1998).
Venezia, Paul , "NetDetector Captures Intrusions", *InfoWorld Issue 27*, ("Venezia"), (Jul. 14, 2003).
Whyte, et al., "DNS-Based Detection of Scanning Works in an Enterprise Network", *Proceedings of the 12th Annual Network and Distributed System Security Symposium*, (Feb. 2005), 15 pages.
Williamson, Matthew M., "Throttling Viruses: Restricting Propagation to Defeat Malicious Mobile Code", *ACSAC Conference*, Las Vegas, NV, USA, (Dec. 2002), pp. 1-9.

Adobe Systems Incorporated, "PDF 32000-1:2008, Document management—Portable document format—Part1:PDF 1.7", First Edition, Jul. 1, 2008, 756 pages.
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Cisco "Intrusion Prevention for the Cisco ASA 5500-x Series" Data Sheet (2012).
Clark, John, Sylvian Leblanc,and Scott Knight. "Risks associated with usb hardware trojan devices used by insiders." Systems Conference (SysCon), 2011 IEEE International. IEEE, 2011.
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Gregg Keizer: "Microsoft's HoneyMonkeys Show Patching Windows Works", Aug. 8, 2005, XP055143386, Retrieved from the Internet: URL:https://web.archive.org/web/20121022220617/http://www.informationweek- .com/microsofts-honeymonkeys-show-patching-wi/167600716 [retrieved on Sep. 29, 2014].
Heng Yin et al, Panorama: Capturing System-Wide Information Flow for Malware Detection and Analysis, Research Showcase @ CMU, Carnegie Mellon University, 2007.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].
Mori, Detecting Unknown Computer Viruses, 2004, Springer-Verlag Berlin Heidelberg.
Oberheide et al., CloudAV.sub.—N-Version Antivirus in the Network Cloud, 17th USENIX Security Symposium USENIX Security '08 Jul. 28-Aug. 1, 2008 San Jose, CA.
PCT/US2014/055956 filed Sep. 16 2014 International Search Report and Written Opinion dated Mar. 19, 2015.
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Wahid et al., Characterising the Evolution in Scanning Activity of Suspicious Hosts, Oct. 2009, Third International Conference on Network and System Security, pp. 344-350.
Yuhei Kawakoya et al: "Memory behavior-based automatic malware unpacking in stealth debugging environment", Malicious and

(56) References Cited

OTHER PUBLICATIONS

Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

* cited by examiner

ADVANCED PERSISTENT THREAT (APT) DETECTION CENTER

1. FIELD

Embodiments of the disclosure relate to the field of data security. More specifically, one embodiment of the disclosure relates to a system of discovering and identifying advanced persistent threats (APTs) based on features of previously discovered/identified APTs and non-APTs. Detected APTs may be used to generate analytic data for the prediction of and prevention against future APT attacks.

2. GENERAL BACKGROUND

Over the last decade, malicious software (malware) has become a pervasive problem for Internet users. In some situations, malware is a program or file that is embedded within downloadable content and designed to adversely influence or attack normal operations of a computer. Examples of different types of malware may include bots, computer viruses, worms, Trojan horses, spyware, adware, or any other programming that operates within an electronic device (e.g., laptop computer, desktop computer, tablet computer, smartphone, server, router, wearable technology, or other types of electronics with data processing capabilities) without permission by the user or an administrator.

Advanced persistent threats (APTs) are a type of malware that target a particular individual and seek to extract a particular set of information that is known to be accessible to the defined target. The targets may include individuals and organizations with high value information (e.g., classified or sensitive defense secrets and information that would be considered trade secrets or intellectual property). For example, an electronic mail (email) message may be sent to the Chief Executive Officer (CEO) of a company. The email message may contain an attachment, such as a Portable Document Format (PDF) document, with embedded executable malware that is intended to perform industrial espionage. When opened, the executable malware in the document may target financial data for the company only accessible to the CEO. Although the document may be identified as malware by traditional malware detection systems, these systems may fail to properly identify the attack and associated objects as APTs. Although described in relation to the commercial sector, APTs may seek to perform nation state attacks for the purposes of political terrorism or espionage.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

I. Overview

Figure 1A:
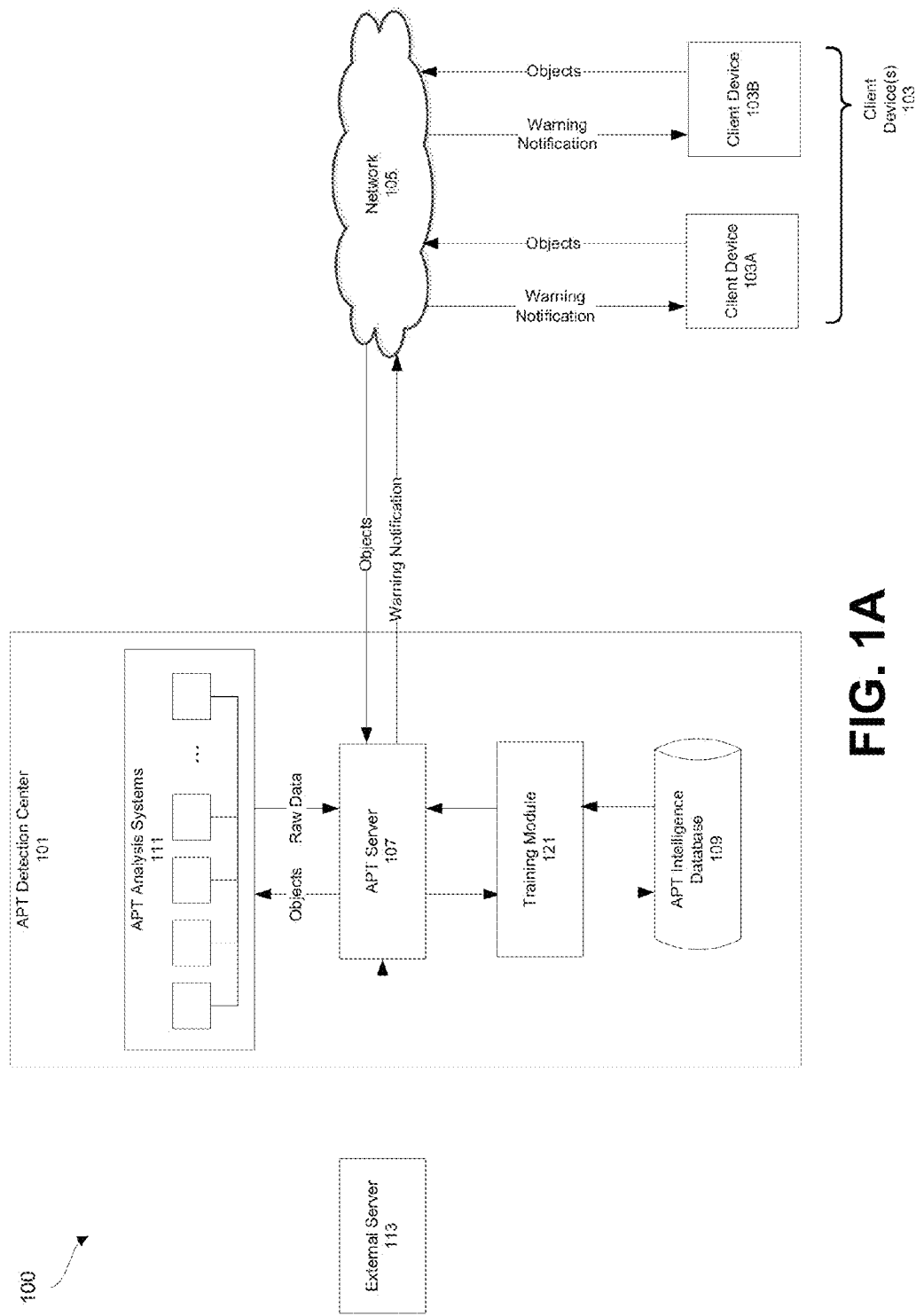
FIG. 1A is a first exemplary block diagram of a communication system that includes an advanced persistent threat (APT) detection center connected to one or more client devices over a network according to one embodiment of the invention.

In one embodiment of the invention of an Advanced Persistent Threat (APT) detection center is provided that analyzes one or more objects received from a client device 103 or another digital device. These objects may be generally defined as selected portions of content under analysis that may contain advanced persistent threats (APTs). An APT is a type of malware that is directed at a particular target and seeks to surveil, extract, and/or manipulate data to which the defined target would have access. An APT attacker may utilize non-public or non-commonly known information to support the APT attack. The targets may include individuals and organizations with high value information (e.g., classified or sensitive defense secrets and information that would be considered trade secrets or intellectual property). In some instances, APTs may seek to perform nation state attacks for the purposes of political terrorism or espionage.

The APT detection center may determine whether received objects are APTs by extracting features from the received objects. A "feature" is information associated with a characteristic and/or behavior of the object, where the feature may be static (e.g., derived from metadata associated with the object) and/or dynamic (e.g., based on actions performed by the object after virtual processing of the object such as detonation). The extracted features may be compared against features of known APT objects, known non-APT malware objects, and/or known benign objects that were previously classified and recorded/stored in an APT intelligence database.

Following classification of the one or more received objects, the results of the classification may be reported to a user of the client device(s) and stored in the APT intelligence database. In one embodiment, data mining and analysis may be performed on classified objects stored in the APT intelligence database such that additional analytics regarding APTs may be generated. For example, in one embodiment the APT detection center may perform one or more of (1) creating attacker profiles, (2) collecting evidence associated with suspected APT attacks, (3) determining a level of severity of an APT malware object, (4) discovering and identifying overall APT campaigns, (5) performing attribution of APT attacks, and (6) predicting future APT trends. This analysis of data from the APT intelligence database 109 may produce useful data for the prediction of and prevention against future APT attacks.

II. Terminology

In the following description, certain terminology is used to describe aspects of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but is not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic (or engine) may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "content" generally refers to information transmitted as one or more messages, where each message(s) may be in the form of a packet, a frame, an Asynchronous Transfer Mode "ATM" cell, or any other series of bits having a prescribed format. The content may be received as a data flow, namely a group of related messages, within ingress data traffic. An "object" may be construed as a portion of the content, namely information within one or more of the messages.

Herein, content and/or objects may include one or more types of data such as text, software, images, audio, metadata and/or other digital data. One example of content may include web content, or any data traffic that may be transmitted using a Hypertext Transfer Protocol (HTTP), Hypertext Markup Language (HTML) protocol, or may be transmitted in a manner suitable for display on a Web browser software application. In one embodiment, the content and/or objects may be independent of operating systems running on electronic devices of the described system.

Another example of content and/or objects includes electronic mail (email), which may be transmitted using an email protocol such as Simple Mail Transfer Protocol (SMTP), Post Office Protocol version 3 (POPS), or Internet Message Access Protocol (IMAP4). A further example of content includes an Instant Message, which may be transmitted using Session Initiation Protocol (SIP) or Extensible Messaging and Presence Protocol (XMPP) for example. Yet another example of content includes one or more files that are transferred using a data transfer protocol such as File Transfer Protocol (FTP) for subsequent storage on a file share.

The term "malware" is directed to software that produces an undesired behavior upon execution, where the behavior is deemed to be "undesired" based on customer-specific rules, manufacturer-based rules, any other type of rules formulated by public opinion or a particular governmental or commercial entity, or an indication of a potential exploit in a particular software profile. This undesired behavior may include a communication-based anomaly or an execution-based anomaly that (1) alters the functionality of an electronic device executing application software in a malicious manner; (2) alters the functionality of an electronic device executing that application software without any malicious intent; and/or (3) provides an unwanted functionality which is generally acceptable in other context.

As noted above, an advanced persistent threat (APT) is a type of sophisticated network attack that is directed at a particular target and seeks to surveil, extract, and/or manipulate data to which the defined target would have access to. APTs may seek to maintain a persistent attack on a target system for a prolonged period of time in comparison with traditional malware. APTs include but are not limited to targeted attacks on individuals and organizations with high value information (e.g., classified or sensitive defense secrets and information that would be considered trade secrets or intellectual property), nation state attacks, cyber/industrial espionage, cyber warfare and watering hole attacks. For example, an email message that is specifically directed to a particular individual at a company (e.g., an officer of the company) and attempts to extract sensitive data that the defined target would have access to may be defined as an APT. In some embodiment, APTs may utilize keyloggers or other data exfiltration methods. APTs often use spearfishing for gaining initial network entry, where the APT malware may be specifically directed to a person in an organization and personal information is included in the object to elicit an action by the targeted individual that permits access by the APT malware. For example, an APT email message may include text/greetings that are personalized for the defined target along with an attachment (e.g., a Portable Document Format (PDF) document). The attachment may contain malicious content such that upon opening, detonating, or otherwise activating the attachment, the malicious content attempts to extract and/or manipulate targeted data accessible to the defined target.

The term "transmission medium" is a communication path between two or more systems (e.g. any electronic devices with data processing functionality such as, for example, a security appliance, server, mainframe, computer, netbook, tablet, smart phone, router, switch, bridge or router). The communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

In general, a "virtual machine" (VM) is a simulation of an electronic device (abstract or real) that is usually different from the electronic device conducting the simulation. A VM may be used to provide a sandbox or safe runtime environment separate from a production environment to enable detection of APTs or malware in a safe environment. The VM may be based on specifications of a hypothetical computer or emulate the computer architecture and functions of a real world computer. A VM can be one of many different types such as, for example, hardware emulation, full virtualization, para-virtualization, and/or operating system-level virtualization virtual machines.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. General Architecture

Referring to FIG. 1A, an exemplary block diagram of a first illustrative embodiment of a communication system 100 is shown. Herein, the communication system 100 includes an APT detection center 101 communicatively coupled to client device(s) 103 (e.g. one or more client devices 103A and 103B) over transmission medium forming a network 105. In general, according to this embodiment, the APT detection center 101 receives objects from the client device(s) 103 for processing and classification. In response to receiving the objects, the APT detection center 101 automatically determines whether the received objects are APTs and, in response to detection of one or more APT objects, may be configured to transmit warning messages to a corresponding client device 103 and/or other devices (e.g. network device managed by information technology personnel). The warning messages would indicate to a targeted recipient (e.g., client, IT personnel, etc.) of a targeted APT type malware.

It is contemplated that the APT detection center 101 may conduct further operations, including one or more of the following: creating attacker profiles based on detected APT objects, preserving evidence associated with detected APT objects uncovered during a suspected APT attack, gauging a level of severity of an APT object, and predicting future APT attack trends. This automated analysis provides an efficient system for combating and preventing APT attacks. Each element of the communication system 100 will be described by way of example below.

As noted above, the communication system 100 may include one or more client devices 103A and 103B coupled to the APT detection center 101 through the network 105. Network 105 may be a private network (e.g. enterprise network) in which both the APT detection center 101 and the client devices 103A and 103B are on the same network. Alternatively, network 105 may be a public network in which the APT detection center 101 is remotely accessed by a network device (e.g. client 103A/103B, etc.).

Herein, the client device(s) 103 may be any type of digital devices, including laptop computers, desktop computers, tablet computers, smartphones, servers, network devices (e.g., firewalls and routers), wearable technology, process controllers, or other types of electronics with data processing capabilities and typically have network connectivity. Furthermore, the client device(s) 103 may include one or more processors with corresponding memory units for processing data. The processors and memory units are generally used here to refer to any suitable combination of programmable data processing components and data storage that conduct the operations needed to implement the various functions and operations of the client device(s) 103. The processors may be special purpose processors such as an application-specific integrated circuit (ASIC), a general purpose microprocessor, a field-programmable gate array (FPGA), a digital signal controller, or a set of hardware logic structures (e.g., filters, arithmetic logic units, and dedicated state machines) while the memory units may refer to microelectronic, non-volatile random access memory. An operating system may be stored in the memory units of the client device(s) 103, along with application programs specific to the various functions of the client device(s) 103, which are to be run or executed by the processors to perform the various functions of the client device(s) 103. For example, the memory units of a client device 103 may store email and/or web-browser applications that are run by associated processors to send, receive, and view corresponding data objects.

Figure 1B:
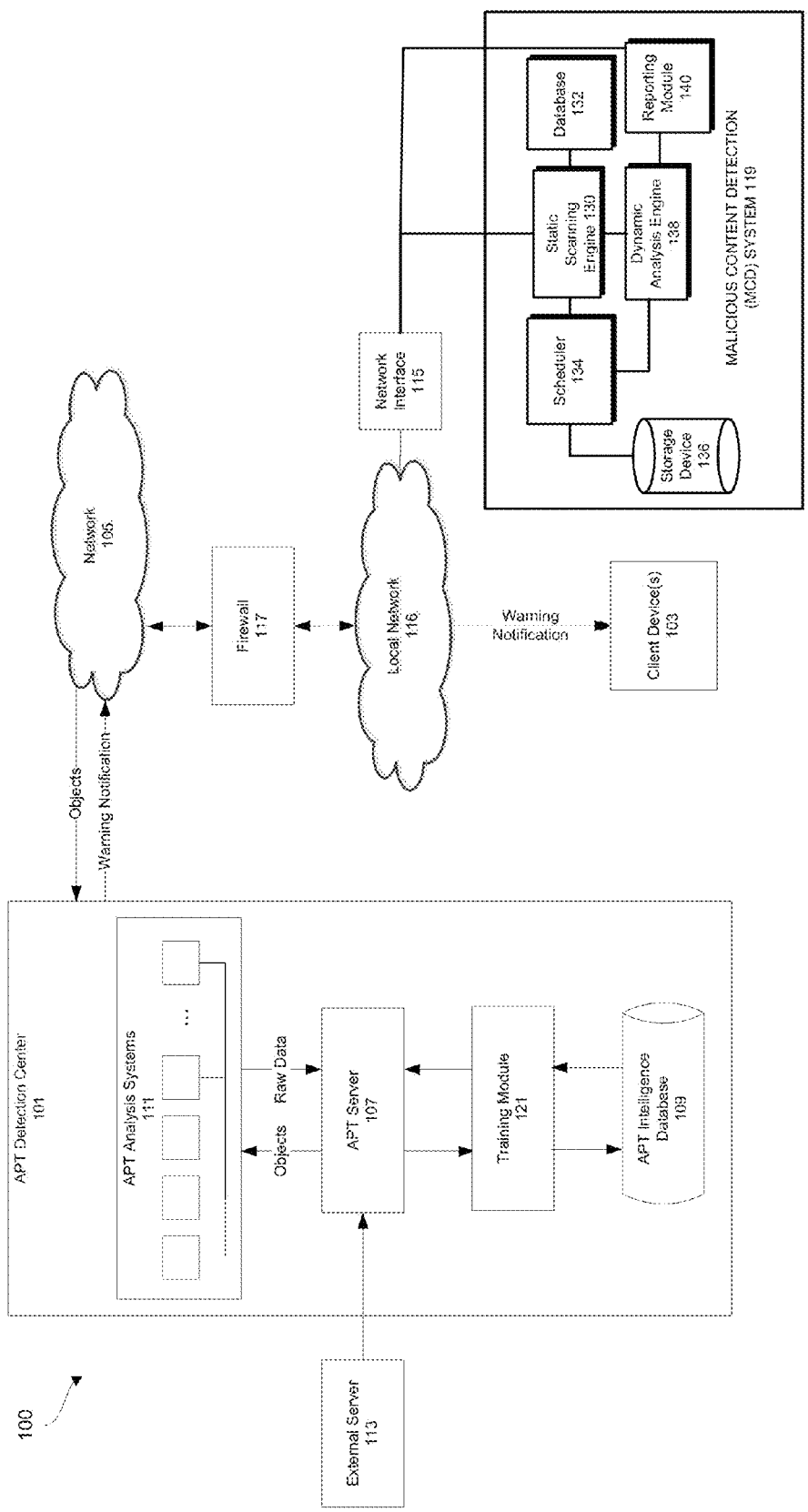
FIG. 1B is a second exemplary block diagram of a communication system that includes an APT detection center connected to one or more client devices and a malware content detection (MCD) system over a network according to one embodiment of the invention.

According to another embodiment of the invention, as shown in FIG. 1B, an exemplary block diagram of a second illustrative embodiment of communication system 100 deploying one or more malware content detection (MCD) systems (e.g. MCD system 119), which is an electronic device that is adapted to analyze information associated with network traffic routed over a local network 116 to client device(s) 103. More specifically, MCD system 119 is configured to conduct static analysis of an object within content under analysis (e.g., a file that is part of message(s) transmitted via the network traffic) received via local network 116 and, where applicable, classify the object with different "malicious" scores. An object may be classified with a first level (e.g. "suspicious"—assigned a score less than or equal to a first threshold) when at least one characteristic identified during scanning of the object by the static scanning engine 170 indicates a certain level of probability that the object includes malware. Similarly, the file may be classified with a second level (e.g. "malicious"—assigned a score greater than or equal to a second threshold greater than the first threshold) when at least one characteristic observed during these scanning operations indicates a certain greater level of probability that the file includes malware.

The MCD system 119 is shown as being coupled with the local network 116, normally behind a firewall (not shown) via a network interface 115. The network interface 115 operates as a data capturing device (referred to as a "tap" or "network tap") that is configured to receive data traffic propagating to/from the client device(s) 103 and provide content from the data traffic to the MCD system 119.

In general, the network interface 115 receives and duplicates the content that is received from and provided to client device(s) 103 normally without an appreciable decline in performance. The network interface 115 may duplicate any portion of the content, for example, one or more files that are part of a data flow or part of the payload contained within certain data packets, metadata, or the like.

It is contemplated that, for any embodiments where the MCD system 119 is implemented as an dedicated appliance or a dedicated computer system, the network interface 115 may include an assembly integrated into the appliance or computer system that includes network ports, network interface card and related logic (not shown) for connecting to the local network 116 to non-disruptively "tap" data traffic and provide a copy of the network traffic to the static scanning engine 170. In other embodiments, the network interface 115 can be integrated into an intermediary device in the communication path (e.g., firewall, router, switch or other network device) or can be a standalone component, such as an appropriate commercially available network tap. In virtual environments, a virtual tap (vTAP) can be used to duplicate files from virtual networks.

Referring still to FIG. 1B, MCD system 119 may include a scanning engine 130, a database 132, a scheduler 134, a storage device 136, a dynamic analysis engine 138 and a reporting module 140. In some embodiments, the network interface 115 may be contained within the MCD system 119. Also, static scanning engine 130, scheduler 134 and/or dynamic analysis engine 138 may be software modules, which are executed by one or more processors (or different processors) and are configured to receive content and analyze one or more objects associated with that content. After analysis, the object(s) that may constitute APT objects are output from reporting module 140 back through network interface 140 to APT detection center 101.

In one embodiment, the static scanning engine 130 may serve as a filter to permit subsequent malware analysis only on a portion of incoming content, which effectively conserves system resources and provides faster response time in determining the presence of malware within the analyzed content. As shown in FIG. 1B, the static scanning engine 130 receives the copy of incoming content from the network interface 115 and applies heuristics to determine if any of the content is "suspicious". The heuristics applied by the static scanning engine 130 may be based on data and/or rules stored in the database 132. Also, the static scanning engine 130 may examine the image of the captured content without executing or opening the captured content.

For example, the static scanning engine 130 may examine the metadata or attributes of the captured content and/or the code image (e.g., a binary image of an executable) to determine whether a certain portion of the captured content matches (e.g. a high level of correlation with) a predetermined pattern of attributes that is associated with a malicious attack. According to one embodiment of the disclosure, the static scanning engine 130 flags content from one or more data flows as suspicious after applying this heuristic analysis.

Thereafter, according to one embodiment of the invention, the static scanning engine 130 may be adapted to transmit at least a portion of the metadata of the suspicious content to the dynamic analysis engine 138. The portion of the metadata may identify attributes of the runtime environment in which the suspicious content should be processed and, on occasion, of the client device(s) 103 to which the suspicious content was being sent. Such metadata or attributes are used to identify a configuration of the VM needed for subsequent malware analysis. In another embodiment of the disclosure, the dynamic analysis engine 138 may be adapted to receive one or more messages (e.g. data packets) from the static scanning engine 130 and analyze the message(s) to identify the software profile information associated with the needed VM.

For instance, as an illustrative example, the suspicious content under test may include an email message that was generated, under control of Windows® 7 Operating System, using a Windows® Outlook 2010, version 1. Upon determining that the email message includes suspicious content such as an attachment for example, static scanning engine 130 provides software profile information to scheduler 134 to identify a particular configuration of VM needed to conduct dynamic analysis of the suspicious content. According to this illustrative example, the software profile information would include (1) Windows® 7 Operating System (OS); (2) Windows® Outlook 2010, version 1; and perhaps an Adobe® reader if the attachment is a PDF document.

The static scanning engine 130 supplies the software profile information to the scheduler 134, which determines whether any of the VM disk files within storage device 136 feature a software profile supporting the above-identified configuration of OS and one or more applications or a suitable alternative. .

The dynamic analysis engine 138 is adapted to execute multiple VMs, to simulate the receipt and processing of different types of "suspicious" content as well as different operating environments. Furthermore, the dynamic analysis engine 138 monitors and analyzes the activities and other behaviors of such content during processing in the VM. The behaviors may include those expect and/or not expected during processing of that type of content. Unexpected behaviors can be considered anomalous behaviors. Examples of anomalous behaviors may include unusual network transmissions, opening certain ports to retrieve data, unusual changes in performance, and the like. This detection process is referred to as a dynamic malicious content detection.

The dynamic analysis engine 138 may flag the suspicious content as malware according to the observed behavior of the VM. In response to detecting anomalous behaviors that tend to indicate an APT attack (e.g., either certain combinations of anomalous behaviors or anomalous behaviors of a particular, APT-related nature), the reporting module 140 may issue not only alerts warning of the presence of malware, but also, may create a message including the suspicious objects for transmission to the APT detection center.

As shown in FIG. 1B, the APT detection center 101 is communicatively coupled to one or more malware content detection (MCD) systems 119 over network 105 (e.g., "cloudbased"). In general, the APT detection center 101 receives objects from the MCD system 119, where the objects are previously statically scanned and/or dynamically analyzed as described above. In response to receipt of the object(s), the APT detection center 101 is configured to automatically determine whether the received objects are APTs and, in response to detection of an APT object, transmits warning messages to MCD system 119 and/or a corresponding client device 103 as described above.

Further, in some embodiments although not shown, the APT detection center 101 may be implemented behind the firewall 117 of FIG. 1B and communicatively coupled so as to be part of local network 116. Hence, APT detection and classification is performed entirely or primarily within the enterprise. Alternatively, APT detection center 101 may be resident on the client device(s) 103 and/or the MCD system 119 such that APT detection and classification is performed entirely or primarily on the client device(s) 103 and/or MCD system 119.

In one embodiment, the client device(s) 103 may each include one or more network interfaces for communicating with the APT detection center 101 and other devices over the network 105. The network interfaces may communicate with one or more devices using wireless and/or wired protocols, including the IEEE 802.3 and the IEEE 802.11 suite of standards. In one embodiment, as will be described in greater detail below, the network interfaces of the client device(s) 103 allow transmission of suspect/potential APT objects to the APT detection center 101 for analysis and classification over the network 105.

The network 105 may be any network or networks (including, for example, the Internet) capable of transferring data between the APT detection center 101 and the client device(s) 103. For example, the network 105 may include one or more wired or wireless routers, switches, and other digital networking devices that operate using one or more protocols (e.g., IEEE 802.3 and IEEE 802.11) to transfer data between a source and its intended destination. Alternatively, network 105 may include a public network (e.g. Internet) or is solely an enterprise network.

In one embodiment, the communication system 100 may include an external server 113 for providing data to the APT detection center 101. The data received from the external server 113 may be associated with objects received from the client device(s) 103. For example, the data received from the external server 113 may further describe the operation and features of suspect objects received from the client device(s) 103 as will be explained in further detail below. The external server 113 may be any computing or storage device, including a laptop computer, a desktop computer, or a web server. As shown in FIGS. 1A-1B, the external server 113 may maintain a separate connection with the APT detection center 101 distinct from the network 105. However, in alternate embodiments the external server 113 may communicate with the APT detection center 101 over the network 105. Although shown as a single external server 113, in other embodiments, two or more external servers 113 may be in communication with the APT detection center 113 to supplement data of suspected APT objects.

The APT detection center 101 includes multiple components for processing suspect objects received from the client device(s) 103. The processing may include the determination of whether the received objects are APTs based on comparisons with previously identified APTs and previously identified non-APTs as will be discussed in further detail below.

As shown in FIGS. 1A-1B, the APT detection center 101 may include an APT server 107, an APT intelligence database 109, and one or more APT analysis systems 111. Each element of the APT detection center 101 will be described by way of example below. Furthermore, this disclosure describes the supply of the object from one of the client device(s) 103, although it is contemplated that the objects for APT analysis by the APT detection center 110 may be supplied from the MCD system 119 or any other network device or directly via a suitable interface.

Figure 2A:
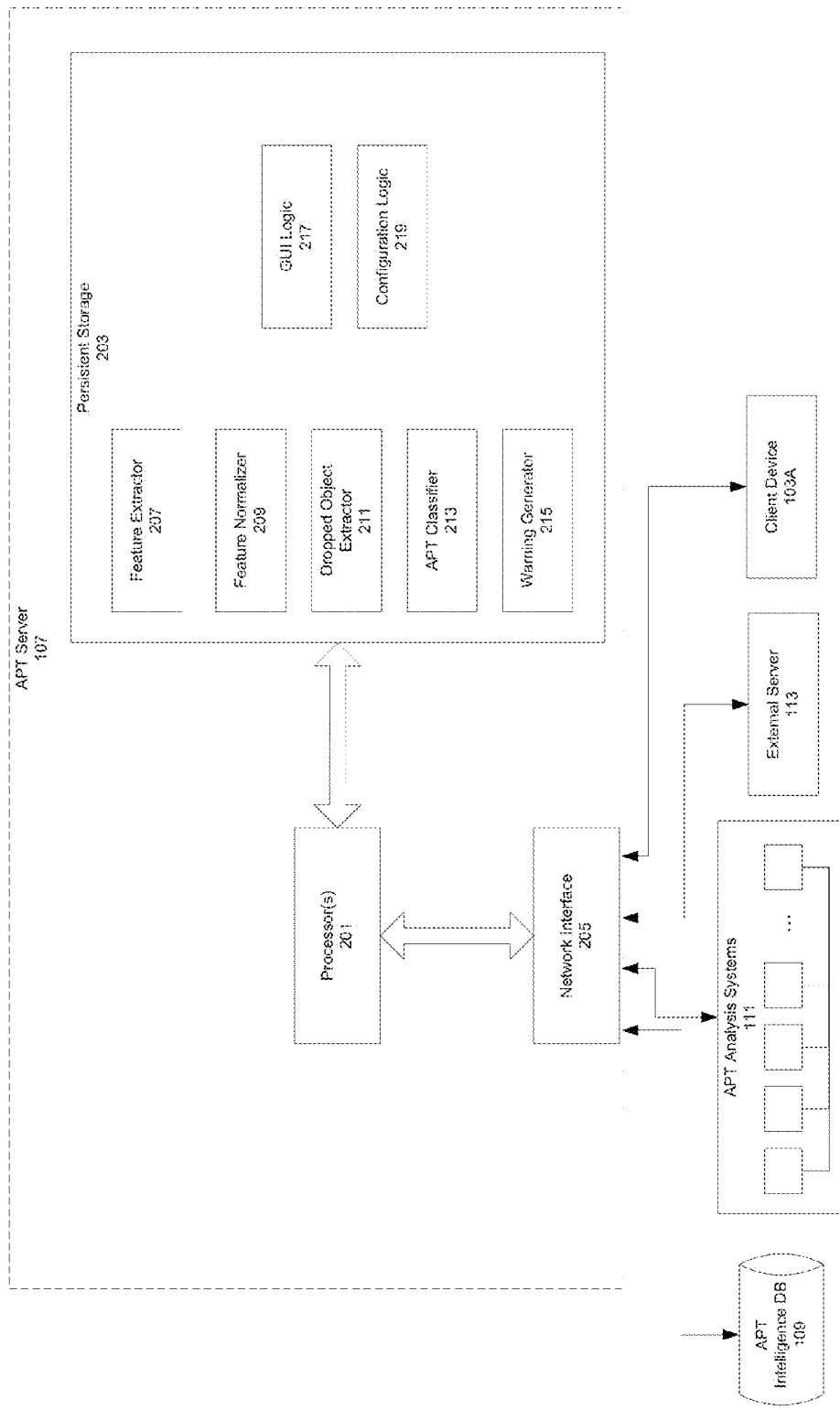
FIG. 2A is a first exemplary block diagram of an APT server of the APT detection center of FIG. 1A or FIG. 1B according to one embodiment of the invention.

FIG. 2A shows a component diagram of the APT server 107 according to one embodiment of the invention. As shown, the APT server 107 may include one or more processors 201 and a persistent storage unit 203. The one or more processors 201 and the persistent storage unit 203 are generally used here to refer to any suitable combination of programmable data processing components and data storage that conduct the operations needed to implement the various functions and operations of the APT server 107. The processors 201 may be special purpose processors such as an application-specific integrated circuit (ASIC), a general purpose microprocessor, a field-programmable gate array (FPGA), a digital signal controller, or a set of hardware logic structures (e.g., filters, arithmetic logic units, and dedicated state machines) while the persistent storage unit 203 may refer to microelectronic, non-volatile random access memory. An operating system may be stored in the persistent storage unit 203, along with application programs specific to the various functions of the APT server 107, which are to be run or executed by the processors 201 to perform the various functions of the APT server 107.

In one embodiment, the APT server 107 may include a network interface 205 for communicating with various components external to the APT server 107. The network interface 205 may communicate with one or more devices using wireless and/or wired protocols, including the IEEE 802.3 and the IEEE 802.11 suite of standards. In one embodiment, the network interface 205 allows the APT server 107 to communicate with the APT intelligence database 109, the APT analysis systems 111, the external server 113, and/or the client devices 103A and 103B over one or more wired and/or wireless transmission mediums.

In one embodiment, as shown in FIG. 2A, the persistent storage unit 203 may store logic, including a feature extractor 207, a feature normalizer 209, a dropped object extractor 211, an APT classifier 213, a warning generator 215, graphical user interface (GUI) 217, and/or configuration logic 219. Each of these elements may be discrete software components that may be processed/run by one or more of the processors 201. Each element stored in the persistent storage unit 203 and shown in FIG. 2A will be described below by way of example using the method for discovering and classifying APT objects 300 shown in FIG. 3.

The method for discovering and classifying APT objects 300 may begin at operation 301 with receipt of a suspect object from the client device 103A. In one embodiment, operation 301 may be performed by the network interface 205 of the APT server 107. In this embodiment, the suspect object may be received from the client device 103A over the network 105 through the network interface 205 as shown in FIGS. 1A-1B and 2. The transmission may be made using either wired or wireless transmission mediums between the client device 103A and the APT server 107.

In one embodiment, a user of the client device 103A submits a suspect object through an interface. The interface may be generated by the GUI logic 217 and served to the client device 103A using the configuration logic 219 of the APT server 107. In this fashion, the APT server 107 may operate as a web-server to deliver data and a user interface to the client device 103A.

Figure 4A:
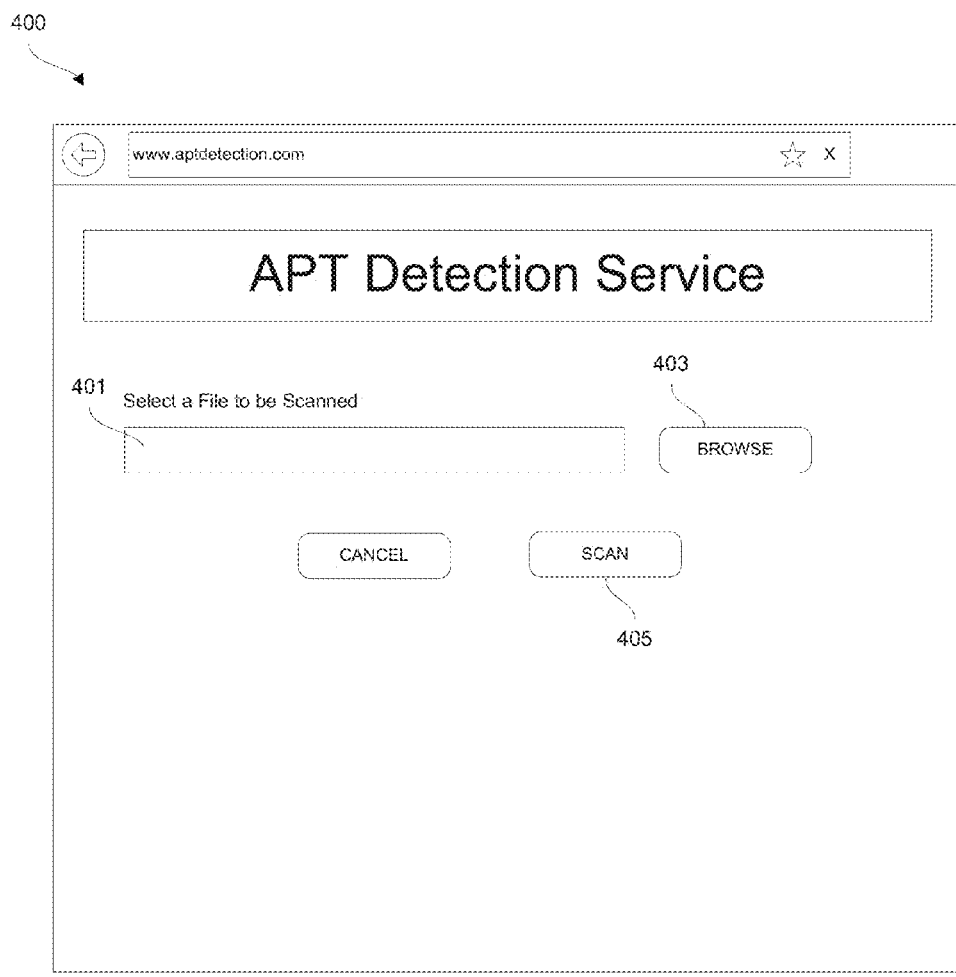
FIG. 4A shows an example user interface for entering information for a suspect object according to one embodiment of the invention.

FIG. 4A shows a web-interface 400 for submitting a suspected object to the APT server 107 according to one embodiment. In this example interface, a user may direct a web browser running on the client device 103A to view the web-interface 400. The user may thereinafter enter the address/location of a suspect object into the web-interface 400 using the address input field 401 and the "BROWSE" button 403. The entered address indicates the location of the suspect object in storage on the client device 103A or on a remote device (e.g., stored on a server). After selection of a suspect object, the user may submit the suspect object to the APT server 107 by selecting the "SCAN" button 405 in the web-interface 400. The suspect object may be transmitted from the client device 103A such that it is received by the APT server 107 for processing as described above at operation 301.

Although the APT server 107 is described above to serve the web-interface 400 to a browser of the client device 103A, in other embodiments a separate web-server may be in communication with the client device 103A and the APT server 107 to provide the web-interface 400 and facilitate transmission of the suspect object to the APT server 107 from the client device 103A.

Although described above as transmission of a suspect object through the web-interface 400, in other embodiments a suspect object may be received at operation 301 through different techniques. For example, as shown in FIG. 1B, the MCD system 119 may scan ingress traffic to the client device(s) 103. In one embodiment, the MCD system 119 may be deployed as an inline security appliance (not shown) or coupled to the network 105 via the network interface 115 as shown in FIG. 1B. Herein, the MCD system 119 may analyze intercepted objects for malware or other indicators of suspicious content. Upon detecting malware in an intercepted object, the infected object may be forwarded to the APT detection center 101 such that the object is received at operation 301.

In some embodiments, the transmission to the APT detection center 101 may include additional data related to the malware analysis by the MCD system 119, such as characteristics of the intercepted object detected by the system 119. In some embodiments, the MCD system 119 may transmit an email message within which the suspect object was received, a client identifier, and other context information along with the suspect object. This additional information may be used to determine the context of the suspect object (e.g., location of the target, industry of the target, and/or the origin of the attack), which is associated with a client profile that is accessible using the client identifier.

For example, in one embodiment a suspect object may be received through an anti-virus and/or anti-malware tool running on the client device 103A. The tool may periodically or aperiodically and without direct provocation by the user transmit objects to the APT server 107 for processing and analysis. This independent transmission of suspect objects allows the client device 103A to maintain an automatic examination of potential APT objects on the client device 103A without direct interaction by a user.

In one embodiment, a suspect object may be any digital data structure. For example, a suspect object may be a file (e.g., a Portable Document Format (PDF) document), a component of a web page, an image, etc. As described above, a user of the client device 103A may manually determine that an object is suspected to be APT malware or the client device 103A may automatically classify the object as potential APT malware. Although described in relation to receiving a single suspect object from the client device 103A, in other embodiments the APT detection center 101 and the method 300 may be used in relation to multiple suspect objects. For example, the APT detection center 101 and method 300 may be used to analyze multiple suspect objects received from the client device 103A and/or the client device 103B. The suspect objects may be processed by the APT detection center 101 separately using the operations of the method 300 to determine whether each received suspect object is APT malware.

Referring back to FIG. 3, following receipt, the suspect object is detonated (e.g. processed by virtual execution or other operations to activate the suspect object) at operation 303 to produce raw data describing behavior and characteristics of the suspect object. In one embodiment, one or more APT analysis systems 111 of the APT detection center 101 detonate the suspect object to generate the raw data. The APT analysis systems 111 may be one or more separate computing devices or processing units that may independently and discretely activate or detonate the suspect object such that operations associated with the suspect object are performed. For example, in one embodiment the suspect object may be a PDF file. In this embodiment, one or more APT analysis systems 111 may detonate the PDF file by opening the file using an Adobe Reader or other appropriate document reader, and monitoring activities performed and other behaviors of the PDF document and any objects embedded therein.

After detonating the suspect object, the one or more APT analysis systems 111 record operations performed by the suspect object (e.g., behaviors) and other data that describe the suspect object (e.g., characteristics). This recorded data forms raw data describing the suspect object. Use of the APT analysis systems 111 ensure that detonation of the suspect object is controlled and will not result in infection of the client device 103A and/or the compromise of sensitive data. In one embodiment, the APT analysis systems 111 may include one or more virtual machines with various profiles, and may, in some cases, simulate the client device 103A during detonation of the suspect object. These profiles may include software to be run by a virtual machine to process a suspect object. For example, the profiles may include an operating system and one or more suitable computer applications that are required to process the objects. For example, the applications may include a document reader (e.g., an Adobe® Reader for PDF documents) and/or a web browser (for web pages) for detonating the suspect object. The APT analysis systems 111 may include separate processors and memory units for use in detonating the suspect object.

As noted above, detonation of the suspect object at operation 303 produces raw data that describes characteristics and behaviors of the suspect object. For example, the raw data may include details regarding origin of the suspect object stored in metadata, data generated by the suspect object during detonation, data attempted to be accessed by the suspect object (both locally and from remote systems) during detonation, etc.

Although described as raw data being generated after the suspect object has been detonated, in other embodiments the raw data may be generated prior to detonation of the suspect object. For example, raw data may be generated that reflects metadata for the suspect object obtained during a static analysis of the suspect object, including, for example, communications protocols anomaly checks, and object source blacklist checks.

During dynamic analysis, in some cases, the suspect object may generate/drop separate objects during detonation. These dropped objects may be new files (e.g., binary files) or other segments of data or executable code created by the original suspect object. In this embodiment, as further shown in operation 305, the dropped objects may be extracted and passed back to operation 303 for detonation. Accordingly, each of the dropped objects are detonated in a similar fashion as was described in relation to the suspect object to generate raw data characterizing each dropped object. In one embodiment, the dropped objects are associated with the suspect object in the APT intelligence database 109 as will be described in further detail below. In one embodiment, the dropped file extractor 211 of FIG. 2A performs operation 305 to detect, extract, and pass dropped objects to operation 303.

After detonation of the suspect object and any dropped objects produced by the suspect object at operation 303, as shown in operation 307, features associated with the suspect and dropped objects may be extracted from the raw data produced at operation 303. In one embodiment, the features characterize the suspect and/or dropped objects. For example, the features may describe behavior of the objects during detonation and/or metadata associated with the objects. In one embodiment, the extracted features may include information as to whether a suspect object attempted to make out-bound communications during processing of the suspect object, e.g., by a virtual machine, to outside data sources. In another embodiment, the extracted features may indicate the suspect object is attempting to exfiltrate (or send out) data such as identification information of the host that detonates the suspect object (e.g., the APT analysis systems 111) to an external location. Exfiltration of data may indicate that the object is an APT. The features provide a comprehensive characterization of an associated object such that a comparison may be performed to determine whether the object is APT malware, as will be described in greater detail below.

In one embodiment, the extracted features include data that manifest/exhibit that an associated attacker has prior knowledge about the target. For example, the features may include details regarding financial records of a competitor, personal information about the target in the body of a message (e.g., the name or the calendar information of the target), generation of another object/process/file that takes advantage of non-public or not commonly known information of the target, etc. In one embodiment, an object associated with features that exhibit that an associated attacker has prior knowledge about the target may indicate that the object is an APT.

In one embodiment, at operation 307, data related to the suspect object and the dropped objects may be retrieved from external data sources while generating features. For example, data may be retrieved from the external server 113 through the network interface 205. In this embodiment, the external server 113 may be a device on the same local area network as the APT detection center 101 or connected to the APT detection center 101 over a wide area network (e.g., the Internet). For example, as discussed above, the external server 113 may be connected to the APT detection center 101 through the network 105.

In one embodiment, the data retrieved from the external server 113 may include data related to servers attempted to be accessed by the suspect and dropped objects while being detonated (e.g., internet protocol (IP) address of a server). In another embodiment, the external data may include data collected by third parties related to the suspect object (e.g., malware classification information). In one embodiment, operation 307 may be performed by the feature extractor 207.

Following generation of features for the suspect object and/or the dropped objects, the features may be normalized at operation 309. Normalizing features eases comparisons that may be later performed as described below. In one embodiment normalizing the features includes converting feature data into discrete and/or continuous data values. Discrete data may only take particular values. For example, discrete data may be numeric (e.g., the number of dropped objects created) or categorical (e.g., the type of file extension of the suspect object). In contrast, continuous data is not restricted to defined separate values, but may occupy any value over a continuous range. Between any two continuous data values there may be an infinite number of other data values.

For example, in one embodiment the features for the suspect object may include data indicating the size of the suspect object in bytes. Operation 309 may normalize this size data value by comparing the size of the suspect object with a predefined value. For instance, the size of the suspect object may be compared with the predefined value 1024 kilobytes to generate a discrete Boolean data value indicating whether the suspect object is greater than 1024 kilobytes. In one embodiment, operation 309 may be performed by the feature normalizer 209 after receiving features from the feature extractor 207.

At operation 311, the feature data may be stored in the APT intelligence database 109. The APT intelligence database 109 may be a local or remote database that stores feature data for objects analyzed by the APT detection center 101. In one embodiment, the APT intelligence database 109 includes feature data for both objects flagged as APT malware and objects that are flagged as not being APT malware as will be described in further detail below.

In one embodiment, each entry in the APT intelligence database 109 includes an object identifier to uniquely identify the object in the database 109, one or more features for each object generated at operations 307 and 309, identifiers/references/links to associated dropped objects, and a flag indicating if the object has been classified as APT malware. In some embodiments, the features stored in the APT intelligence database 109 are normalized as described above in relation to operation 309.

The APT intelligence database 109 may follow a relational, object, hierarchical, or any other type of database model. In one embodiment, the APT intelligence database 109 is spread across one or more persistent data storage units. The persistent data storage units may be integrated within the APT server 107 or within a separate host device. For example, the APT intelligence database 109 may be located on a remote host device and accessible by the APT server 107 over the network 105. In another example, the APT intelligence database 109 may be coupled to the APT server 107 through a peripheral connection (e.g., a Universal Serial Bus or IEEE 1339 connection).

As noted above, multiple data values may be stored in the APT intelligence database 109 to describe the suspect and dropped objects analyzed at operations 301-309. The data values may include an APT malware flag that indicates whether the analyzed objects are determined to be APT malware by the APT detection center 101. Initially, this APT malware flag may be set to a default value pending operations 313-319.

Following the storage of the suspect and dropped objects in the APT intelligence database 109, operation 313 may determine whether the suspect object is APT malware based on a comparison with one or more objects stored in the APT intelligence database 109. The comparison attempts to determine similarities between the suspect object and objects known to be APT malware and/or objects known to not be APT malware. For example, the suspect object may be considered "similar" to a known APT object when a predefined number of features are determined to be shared between the objects.

The comparison at operation 313 may be performed using one or more discrete and/or continuous data values in the set of features for the suspect object. In one embodiment, at operation 313, features for the suspect object and features for the dropped objects associated with the suspect object are compared with objects in the APT intelligence database 109.

In one embodiment, operation 313 may be performed by the APT classifier 213. In this embodiment, the APT classifier 213 queries the APT intelligence database 109 based on features of the suspect object and/or the dropped objects associated with the suspect object to determine whether the suspect object is APT malware.

In one embodiment, the APT classifier 213 may utilize statistical and machine learning to determine whether the suspect object is APT malware. Machine learning refers to a process or system that can learn from data, i.e., be trained to distinguish between "good" and "bad", or in this case, between APT malware objects and non-APT malware objects. The core of machine learning deals with representation and generalization, that is, representation of data objects (e.g., the behaviors and other analytical results, which can be collectively represented by features of the objects generated at operations 307 and 309), and functions performed on those objects (e.g., weighting and probability formulas). Generalization is the property that the process or system uses to apply what it learns on a learning set of known (or "labeled") data objects to unknown (or "unlabeled") examples. To do this, the process or system must extract learning from the labeled set that allows it to make useful predictions in new and unlabeled cases.

For machine learning, the APT classifier 213 may operate in a training mode and in an operational mode. In a training mode, the APT classifier 213 employs threat heuristics training logic to subject known samples (i.e., labeled samples) of APT malware objects and known samples of clean or non-APT malware objects to calibrate threat heuristics logic for probability scoring and/or decision making of objects. To accomplish this, the threat heuristics training logic may submit APT malware and non-APT malware stored in the APT intelligence database 109 to analyzers. In some embodiments, the threat heuristics training logic may employ a special forensics system. In alternative embodiments, the threat heuristics training logic may test the APT malware and non-APT malware each time it processes a different object, or it may store the results of prior tests for use for future processing of objects. The threat heuristics training logic may assign a probability score to each of the possible patterns resulting from testing the APT malware and non-APT malware. These probability scores and classification labels are indicative of whether an object is APT malware. In one embodiment, the machine learning routines and operations described above may be performed by the learning module 121 shown in FIG. 1A and FIG. 1B based on inputs from the APT server 107 and the APT intelligence database 109.

In an operating mode, the threat heuristics analysis logic combines all features with respect to a current suspect object under test to form a current pattern containing potential indicators of APT malware activity. Then, the threat heuristics analysis logic compares that pattern and/or, in some embodiments, each and every one of the features contained therein, with those obtained during the training mode. Where features are separately analyzed, the threat heuristics analysis logic may assign weights or decisions based on experience during training to features that are deemed more closely associated with APT malware. It then assigns a probability score or classification label to each of the possible patterns, and/or, in some embodiments, to each of the features within each pattern as to its likelihood of appearing in a malicious and/or clean sample based on the learned probability scoring. This may involve determining how closely a pattern of features in a suspect object compares to a labeled sample, using a proximity calculation based on the probability of encountering each attribute in an APT malware and non-APT malware pattern. The end result may be a composite probability score for the current suspect object under test. The score is indicative of whether the current suspect object under test is APT malware. If the score exceeds a predefined threshold value, a decision may be made to apply an APT label to the object and therefore the current suspect object is classified as an APT. Accuracy in prediction of APT malware will depend on the selection and number of relevant features identified, the selection of weights to be assigned to each, the comparison process used, the quality of training, and the threshold selected. The threshold selected will be dependent on the training process.

Upon determining at operation 313 that the suspect object is APT malware, the method 300 moves to operation 315 to flag the suspect object as malware in the APT intelligence database 109. In one embodiment, flagging the suspect object as APT malware includes setting an APT malware data value associated with the suspect object in the APT intelligence database 109 to a selected value, e.g., "true".

Figure 4B:
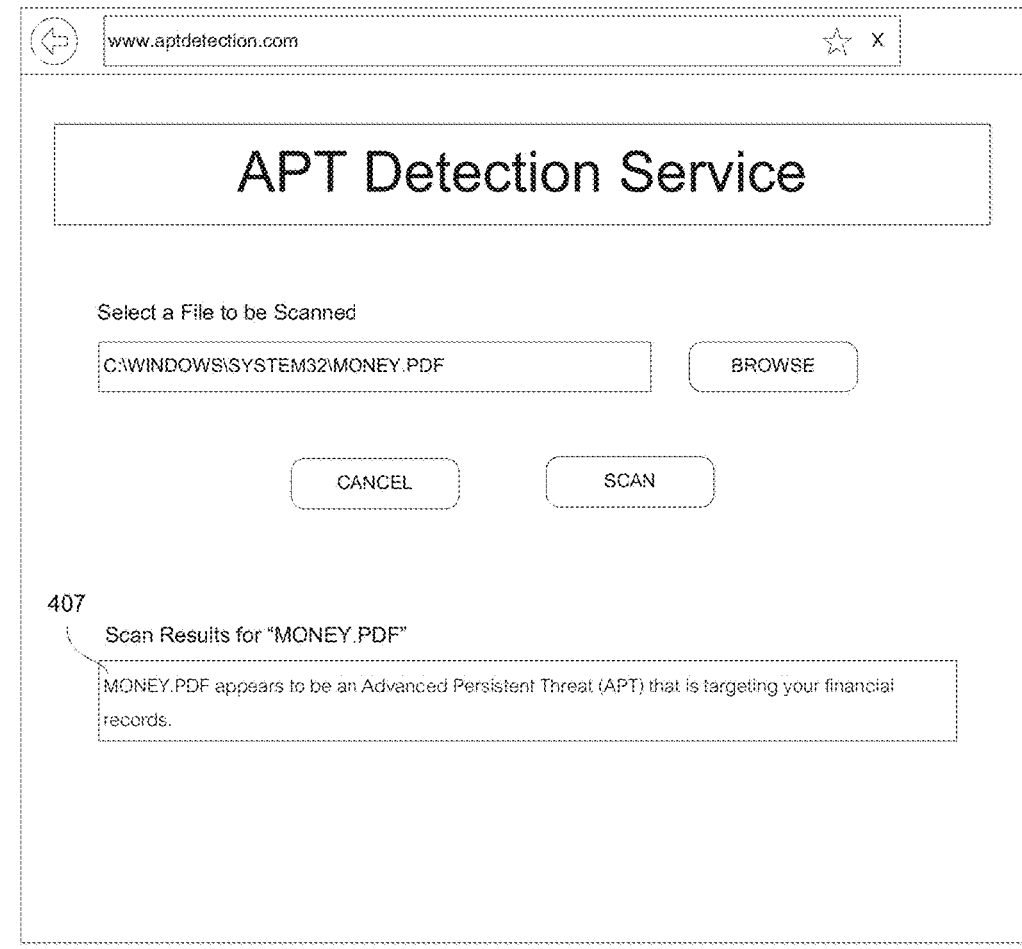
FIG. 4B shows the example user interface of FIG. 4A after a warning message has been returned to a user according to one embodiment of the invention.

After flagging the suspect object as APT malware in the APT intelligence database 109, operation 317 may send a warning to the client device 103A (i.e., the original device transmitting the suspect object). The warning informs a user of the client device 103A that the suspect object is APT malware and should be discarded, deleted, or otherwise avoided. In one embodiment, the warning may be a transmission to a component of the web-interface 400. For example, as shown in FIG. 4B, a dialog box 407 of the web-interface 400 may be updated to indicate that the suspect object is APT malware. In other embodiments, other warnings may be transmitted to the client device 103A. For example, email messages, pop-up messages, or other signals may be transmitted between the APT detection center 101 and the client device 103A to represent the warning message.

Similarly, upon determining at operation 313 that the suspect object is not APT malware, the method 300 moves to operation 319 to determine whether the suspect object is non-APT malware or a benign object based on comparisons with features of known/previously classified objects in the APT intelligence database 109. This comparison may be performed using machine learning and statistical analysis similar to that described above in relation to operation 313. Upon determining that the suspect object is non-APT malware, operation 321 flags the suspect object as non-APT malware in the APT intelligence database 109. In one embodiment, flagging the suspect object as non-APT malware includes setting an APT malware data value associated with the suspect object in the APT intelligence database 109 to a selected value, e.g., "false". Upon determining that the suspect object is non-malware and is benign, operation 323 flags the suspect object as non-malware in the APT intelligence database 109. In one embodiment, flagging the suspect object as non-APT malware includes setting a malware data value associated with the suspect object in the APT intelligence database 109 to a selected value, e.g., "false".

Figure 3:
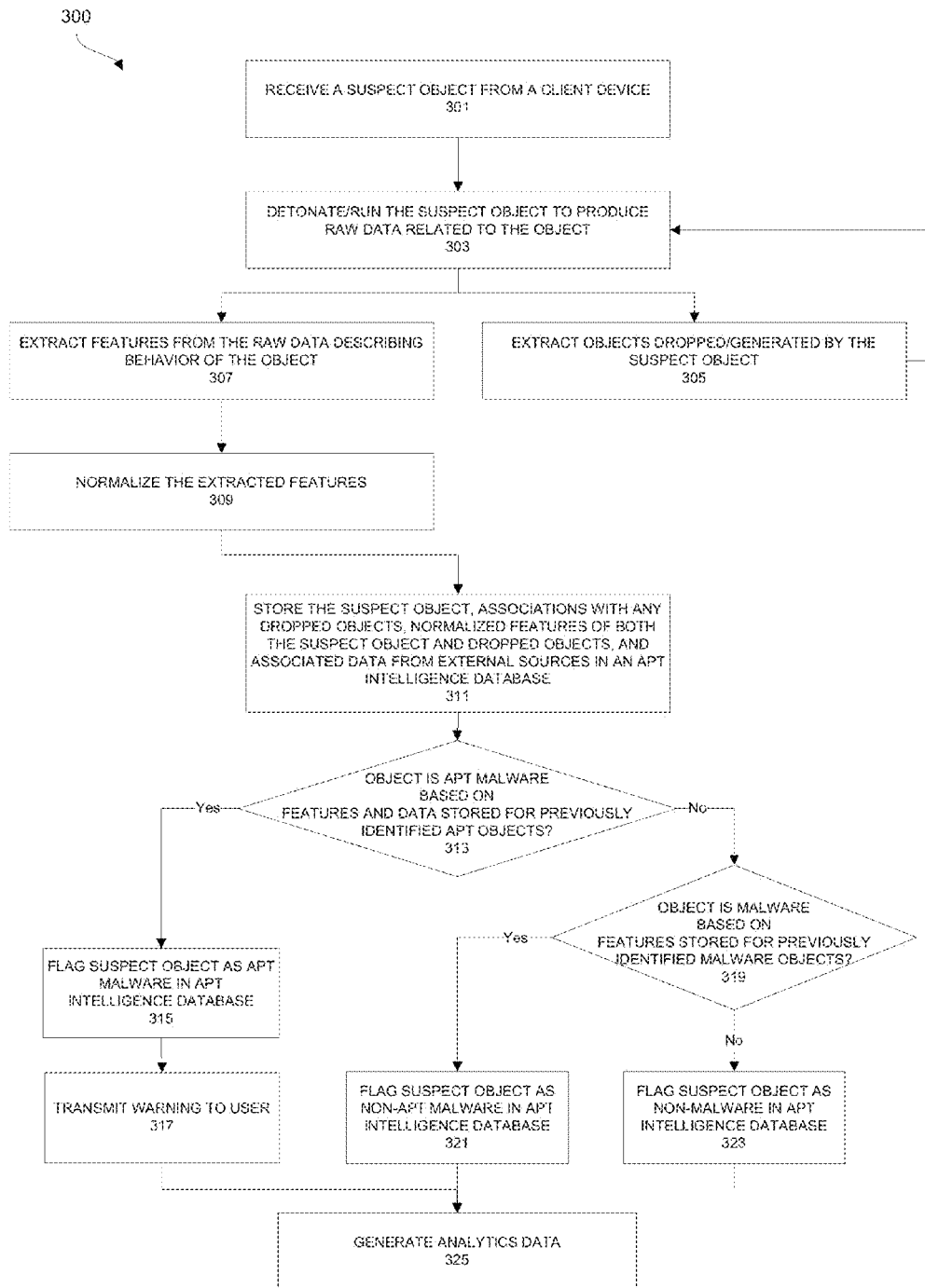
FIG. 3 is a detailed exemplary block diagram showing a method for discovering and classifying APT objects according to one embodiment of the invention.

Although not shown in the FIG. 3, in one embodiment, a message may be transmitted to the client device 103A indicating that the suspect object is non-APT malware and/or non-malware/benign. For example, the dialog box 407 of the web-interface 400 may be updated to indicate that the suspect object is non-APT malware and/or non-malware. In other embodiments, other messages may be transmitted to the client device 103A to indicate that the suspect object is not APT malware. For example, email messages, pop-up messages, or other signals may be transmitted between the APT detection center 101 and the client device 103A. These warnings may be transmitted to other subscribers in addition to the subscriber associated with the current suspect object.

By transmitting a warning message or other messages to the client device 103A identifying a classification of the suspect object, a user of the client device 103A may be better prepared and less susceptible to advanced persistent threats. For example, upon receiving a warning message from the APT detection center 101 at operation 317, the user may delete/quarantine the suspect object(s) (e.g., an email or file) and/or report the suspect object(s) to a network administrator. Also, the APT detection center 101 may generate an identifier for the APT malware including its metadata, such as, for example, its characteristics and behaviors observed during processing. The identifiers may be stored in the APT intelligence database 109 and may be distributed to one or more client devices 103 and MCD system 119. The identifier (or parts thereof) may be used to generate a signature for the APT malware, which may be used in turn by the client devices 103 and MCD systems 119 to block future objects/content where signature matches are found. This proactive action may ensure that the client device 103A is not infected by the suspect object and sensitive data accessible to the user is not compromised by the suspect object.

Although described above in relation to providing a web-interface 400 for directly informing a user of the status of a suspect object (i.e., whether the suspect object is APT malware, non-APT malware, or non-malware), in other embodiments the APT detection center 101 may utilize APT malware determinations for different/additional operations. For example, in one embodiment at operation 325 the APT detection center 101 may perform one or more of (1) creating attacker profiles, (2) collecting evidence, (3) determining the level of severity of an APT malware object, (4) discovering and identifying overall APT campaigns, (5) performing attribution of APT attacks, and (6) predicting future APT trends. In one embodiment, detection of APT objects by the APT detection center 101 may be used for evidence collection and analysis at operation 325 using the post analysis detection module 221 shown in FIG. 2B. For example, by recording features and characteristics of APT objects and non-APT objects, the APT detection center 101 may develop a collection of evidence that may be used for development of future defense systems and/or determination of attack trends.

For example, in one embodiment the objects in the APT intelligence database 109 may be mined/examined to create attacker profiles at operation 325 using the attacker profiler logic 223 and stored in the APT intelligence database 109. The attacker profiles may describe individuals and/or organizations generating and disseminating APT objects. For example, multiple objects in the APT intelligence database 109 that have been identified as APT objects may each include similar features that described a potential attacker.

Figure 5:
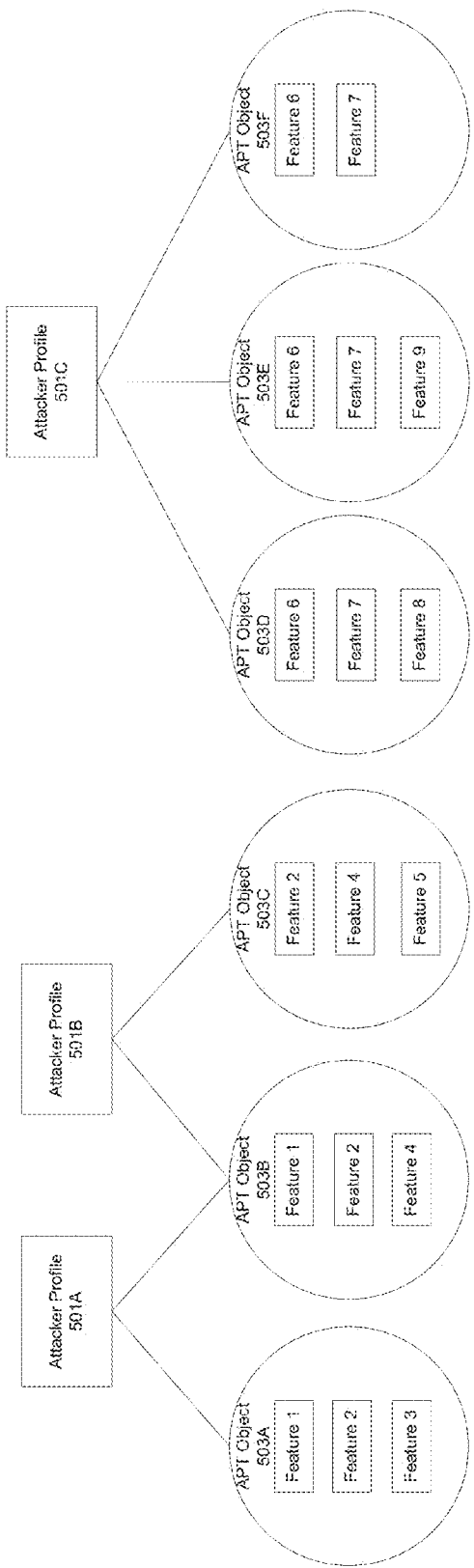
FIG. 5 shows multiple attacker profiles associated with APT objects based on similarity of features according to one embodiment of the invention.

As shown in FIG. 5, attacker profiles 501A-501C are each associated in the APT intelligence database 109 with one or more APT objects 503A-503F. The attacker profiles 501 describe an individual or an organization that generates and/or disseminates APT objects 503, based on shared features in a set of APT objects 503 associated with the attacker profiles 501. For example, attacker profile 501A is associated with APT objects 503A and 503B, which may be stored in the APT intelligence database 109. As shown, each of the APT objects 503A and 503B share features 1 and 2. In this example, attacker profile 501A is defined by features 1 and 2 shared between associated APT objects 503A and 503B. In one embodiment, the features identifying an attacker may include an originating server for the APT objects 503, an originating country for the APT object 503, infrastructure similarities between APT objects 503, dynamic action similarities of the APT objects 503, etc.

As also shown in FIG. 5, attacker profile 501B is associated in the APT intelligence database 109 with APT objects 503B and 503C. This relationship is based on the APT objects 503B and 503C sharing features 2 and 4. Accordingly, in some embodiments, APT objects 503 may be associated with multiple attacker profiles 501 based on disjointed feature similarities between sets of APT objects 503 stored in the APT intelligence database 109. As each new APT is identified, the corresponding attacker profile 501 may be updated to reflect the attack such that the attacker profiles 501 are cumulative.

Attacker profile 503C shown in FIG. 5, is associated in the APT intelligence database 109 with APT objects 503D-503F. These APT objects 503D-503F share features 6 and 7. Although other features are present in each APT object 503D-503F that are not shared between other APT objects 503D-503F, the shared features 6 and 7 are determined to be sufficient to correlate the APT objects 503D-503F with the single attacker profile 501C.

In one embodiment, the attacker profiles 501 may be utilized to attribute APT campaigns to specific attackers using the attacker profiler logic 223. For example, upon detection and classification of an APT object using the method 300 or any other technique, the newly classified APT object may be compared against the APT objects 503 associated with each attacker profile 501 as stored in the APT intelligence database 109 to attribute the newly classified APT object to a specific attacker or set of attackers. The comparison may utilize machine learning and/or statistical analysis as described above to determine a correlation (or "match") at a prescribed level (e.g., with respect to a threshold) that is predetermined or manually set. This attribution may be useful in informing user of the client device(s) 103, network administrator, law enforcement, or other organizations of the APT attack. This attribution may lead to more accurate identification and signatures generations, which may lead to more accurate future detection and blocking of APT objects.

Figure 2B:
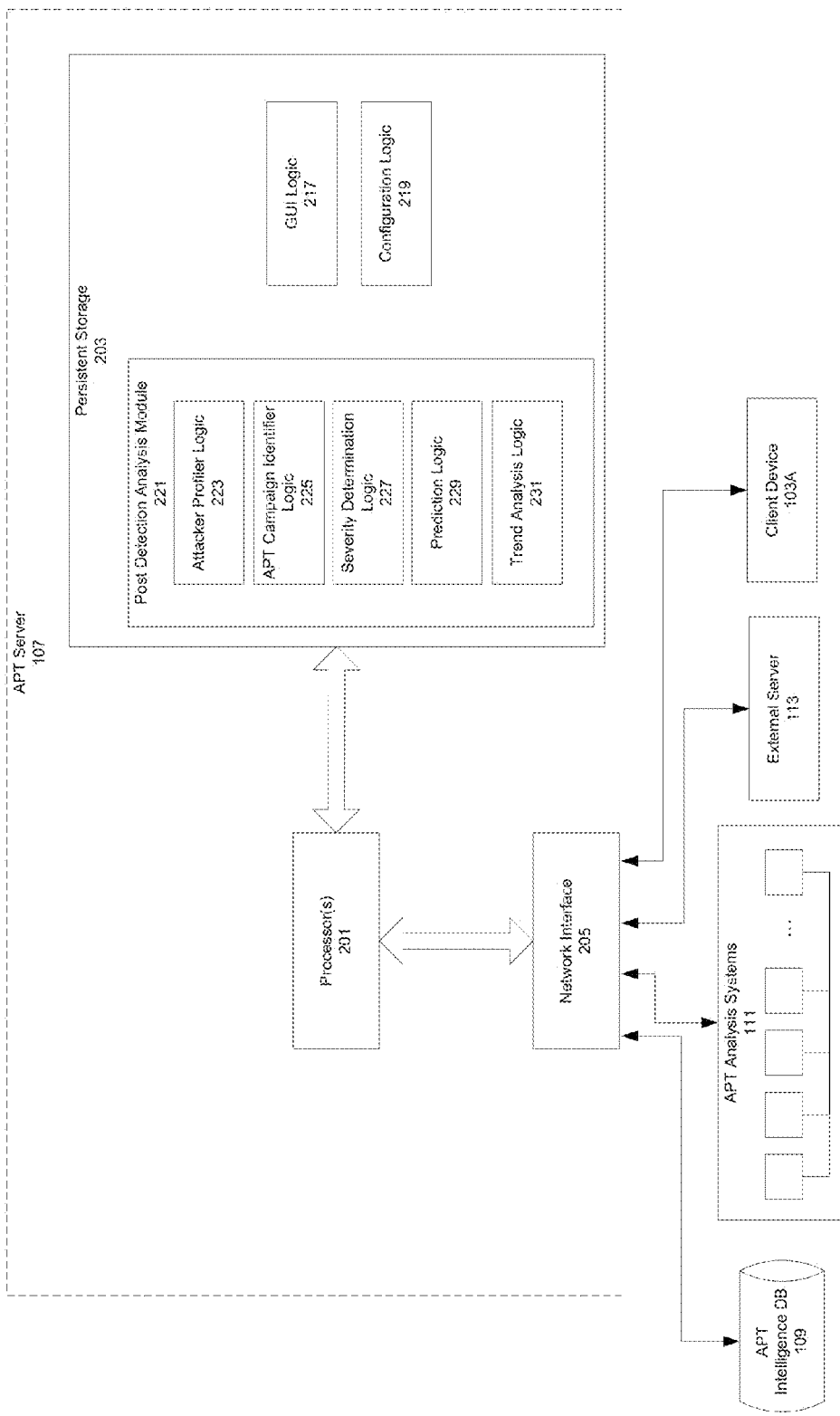
FIG. 2B is a second exemplary block diagram of an APT server of the APT detection center of FIG. 1A or FIG. 1B according to one embodiment of the invention.
Figure 6:
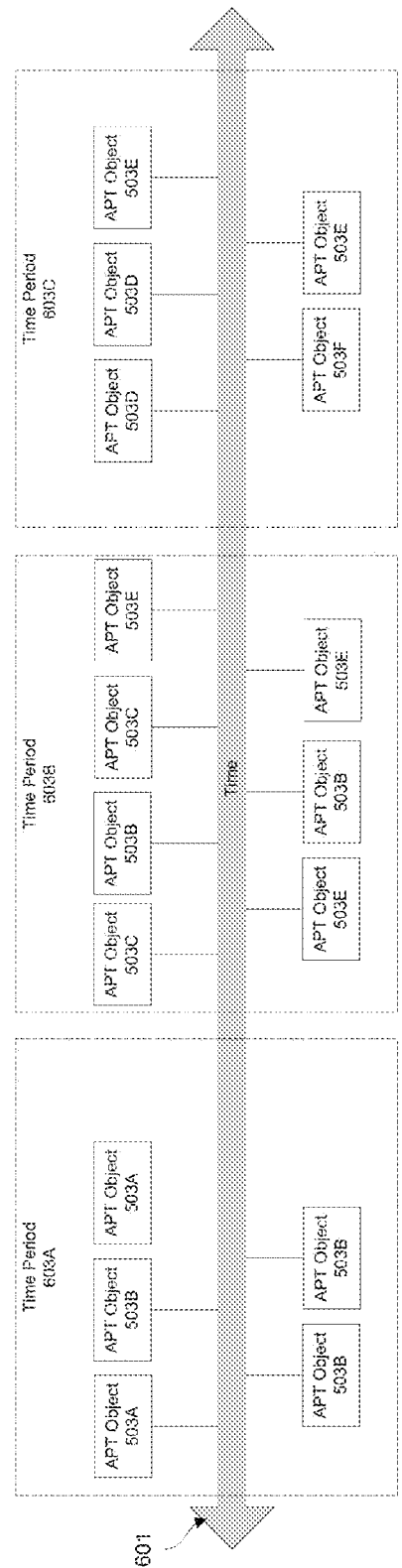
FIG. 6 shows multiple APT objects mapped against a timeline with discrete time periods according to one embodiment of the invention.

In one embodiment, APT campaigns may be determined based on analysis of classified APT objects over time using APT campaign identifier logic 225 of FIG. 2B. As shown in FIG. 6, APT objects 503, which may be stored in the APT intelligence database 109, are mapped against a timeline 601, or, to be more specific, their stored metadata that specifies time information for the APT attack is mapped against the timeline. The APT objects 503 may be compared against specified time frames 603 to determine a possible campaign by a particular attacker defined by an attacker profile 501. For example, the time frames 603 may be between 1-30 seconds, 1-5 hours, 1-3 days, or any other segment of time.

In one embodiment, the number of detected APT objects 503 associated with an attacker profile 501 in a specified time frame 603 is compared against a campaign threshold value. In some embodiments, the campaign threshold value may be set based on prior APT campaigns stored in the APT intelligence database 109. If the number of detected APT objects 503 associated with an attacker profile 501 in the specified time frame 603 is above the campaign threshold value, a campaign by the attacker associated with the attacker profile 601 is confirmed for the specified time frame 603 at operation 325. Information regarding the campaign and its included APT objects is then stored in the APT intelligence database 109.

For example, as shown in FIG. 6, in time frame 603A there are two instances of APT object 503A that have been detected and three instances of APT object 503B that have been detected. In this example the campaign threshold value may be set to four. Since there are collectively five APT objects 503A and 503B from a single attacker profile 501A (as shown in FIG. 5) during the time period 603A, which is greater than the campaign threshold value of four, a campaign corresponding to the attacker profile 501A has been detected.

In another example, seven APT objects 503 have been detected during time period 603B. In particular, two instances of APT object 503B, two instances of APT object 503C, and three instances of APT object 503E have been detected during time period 603B. However, since there are not five or more APT objects 503 (i.e., above the campaign threshold value of four) from the same attacker profile 501 during the time period 603B, an APT campaign is not detected.

In the time period 603C, two APT objects 503D have been detected, two APT objects 503E have been detected, and one APT object 503F has been detected. Since there are collectively five APT objects 503D, 503E, and 503F from a single attacker profile 501C during the time period 603C, which is greater than the campaign threshold value of four, a campaign corresponding to the attacker profile 501C has been detected.

In one embodiment, a detected campaign may be determined relative to an individual industry and/or class. For example, APT campaigns may be determined relative to targets in any of various categories, for example, the financial industry, government institutions, etc. Information regarding these detected campaigns including their targeted industries and classes (e.g., categories) may be stored in the APT intelligence database 109.

In one embodiment, an alert or report of a detected campaign may be forwarded to victims of the campaigns to warn of an ongoing attack. In one embodiment, the features 503 associated with the attacker profile 501 committing the attack, and, if applicable, the targeted industries or classes may also be transmitted along with a warning to the user. In other embodiments, a detected campaign may be reported to network administrators in a target industry and/or law enforcement personnel. In addition to reporting, upon detecting a campaign, associated features may be assigned higher weights during machine learning. Based on this continued learning process, previously classified non-APT objects may be re-analyzed with these new weights to determine if these objects were in fact APTs and part of a campaign.

In one embodiment, the level of severity of an APT object may be determined based on previously categorized APT objects in the APT intelligence database 109 at operation 325 using the severity determination logic 227 shown in FIG. 2B. For example, an administrator may rank the severity of an initial/seed APT object in the APT intelligence database 109. The ranking may be on a one-to-ten scale, where one indicates a non-severe attack and a ten indicates a very severe attack. The severity may be based on the size of the target attacked (e.g., the number of employees or the financial statistics of the target), the damage caused by the attack (i.e., the cost incurred to the target based on the attack), and other similar factors. The initial/seed APT object may be associated with an attacker profile 501 based on a feature set for the APT object. Upon detection of another APT object that shares features with the initial/seed APT object such that the newly detected APT object may be associated with the same attacker profile 501, the newly detected APT object may also inherit the same severity ranking as the initial/seed object. The determination of severity may be recursively performed for new APT objects based on previously ranked objects. In one embodiment, the severity level for a newly detected APT object may be communicated to a user of a client device 103 or another entity, for example, as part of an APT alert or report.

Figure 7:
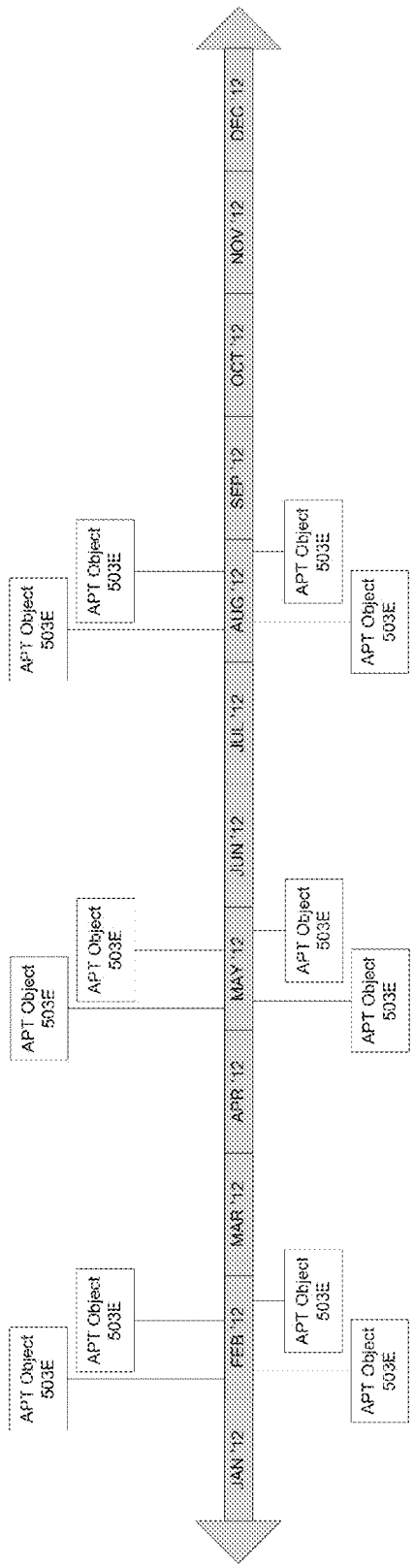
FIG. 7 shows multiple APT objects mapped against a timeline for the determination of APT trends according to one embodiment of the invention.

In one embodiment, the APT detection center 101 may use stored APT objects in the APT intelligence database 109 to predict future attacks and/or determine APT trends at operation 325 using the prediction logic 229 shown in FIG. 2B. For example, as shown in FIG. 7 a cluster of APT objects 503E are detected in February 2012, again in May 2012, and yet again in August 2012. Based on these trends, the APT detection center 101 may determine that the APT object 503E attacks occur with a frequency of every three months. The frequency can be computed based on an average value of the time intervals, or more complicated statistical analyses of the time intervals between past attacks. This information may be extrapolated to compute a prediction of a next attack, and information regarding past attacks can be used to warn potential targets (e.g., a user of client device 103A or those within a specified industry or class) or informing law enforcement personnel of a potential upcoming attack based on previous trends. For example, in the above scenario an attack of APT objects 503E is predicted to occur in November 2012 based on a previous trend of attacks.

Figure 8:
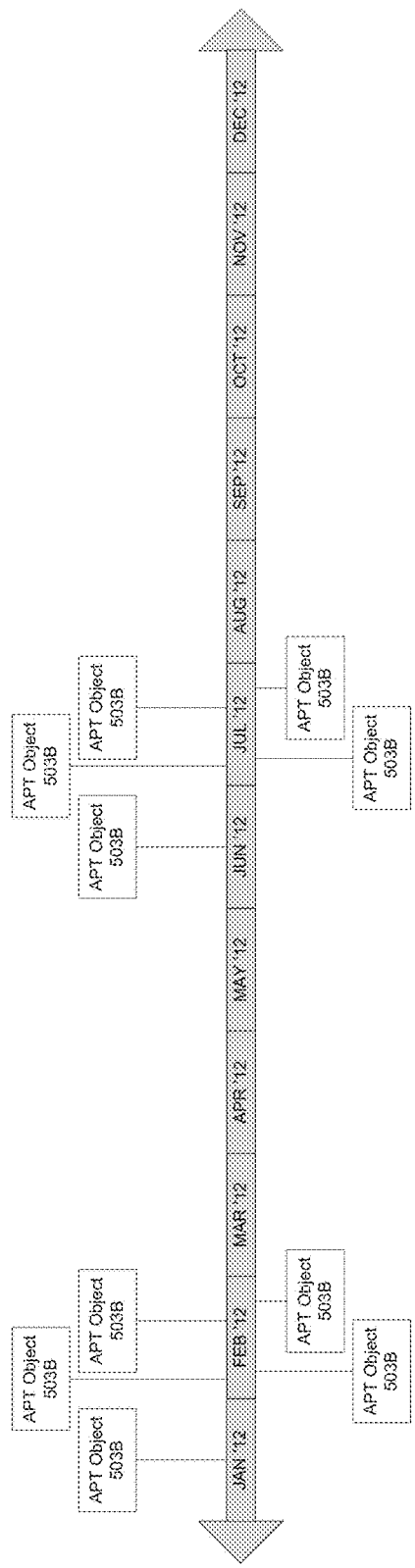
FIG. 8 shows multiple APT objects mapped against a timeline for the determination of APT trends according to one embodiment of the invention.

In one embodiment, the APT detection center 101 may detect trends that indicate the likely occurrence of a future APT attack at operation 325 using the trend analysis logic 231 shown in FIG. 2B. For example, as shown in FIG. 8, a single APT object 503B is detected in January 2012 followed by a number of APT objects 503B in February 2012. Similarly, a single APT object 503B is detected in June 2012 followed by a number of APT objects 503B in July 2012. This trend of a probe APT object 503B followed by a plurality of APT objects 503B the next month may be determined to be a trend by the APT detection center 101 such that upon detection of a single APT object 503B the APT detection center 109 may determine that this detected object 503B is a probe object that foreshadows a larger scale APT attack in the next month. This information may be used to warn potential targets (e.g., a user of client device 103A) or informing law enforcement personnel.

Similar to the description provided above in relation to campaign classifications, in one embodiment a detected trend may be determined relative to an individual industry and/or class of targets. For example, APT trends may be determined relative to the financial industry, government institutions, etc. Moreover, where a plurality of malware and/or campaigns targeting various industries or classes, or a specific industry or class are discovered, predictions as to future trends may be made, using mathematical modeling techniques known to those of ordinary skill in the art, and stored in the APT intelligence database 109.

Information regarding the frequency, trends, and predictions may be stored in the APT intelligence database 109 and modified or confirmed as further APTs are identified. Information regarding the modifications and confirmations may be also issued in warnings and reports. The various warnings and reports may be distributed on a subscription basis.

As described above, based on captured/extracted features the APT detection center 101 using the method 300 may automatically detect APT attacks/objects through the use of previously identified APT object, non-APT objects, and general benign objects. Classified objects may be stored in the APT intelligence database 109 such that data mining and analysis can be performed. For example, in one embodiment the APT detection center 101 may perform one or more of (1) creating attacker profiles, (2) collecting evidence, (3) determining the severity level of an APT malware object, (4) discovering and identifying overall APT campaigns, (5) performing attribution of APT attacks, and (6) predicting future APT trends. This analysis of data in the APT intelligence database 109 may produce useful data for the prediction and prevention of future APT attacks.

As described in greater detail, based on captured/extracted features, the APT detection center may be configured to automatically detect APT attacks/objects through the use of previously identified APT object, non-APT objects, and general benign objects. More specifically, techniques for detecting APT attacks/objects, by discovering and identifying advanced persistent threats (APT) using an APT detection center alone or in combination with malware analysis conducted by the static analysis engine and/or the dynamic analysis engine, may entail the one or more of the following:

(A) An APT server receives an object to be classified. The object may already have been analyzed by a malware detection system or logic and found to be suspicious or even malicious. Malware detection systems may compare features (e.g., characteristics and/or behaviors) of the object with features associated with known malware. The malware detection systems may compare the objects with features of known malware and known non-malware. The feature set for purposes of this comparison may be obtained from a database whose contents are derived from past malware analysis. Malware may include APT as well as non-APT malware.

(B) The APT server extracts features of the object describing behavior of the received object. These extracted features may include those associated specifically with an APT either alone or in combination with other extracted features. Indeed, these extracted features may be highly correlated with an APT, either alone or when considered in combination with other extracted features. The extraction process may take advantage of information stored in the intelligence database to provide efficient identification and extraction of such features. The APT server stores the received object along with the extracted features in an APT database. These stored extracted features may include features that perform any of the following:

1) indicate the object intends to employ spearfishing or other impersonation techniques to gain unauthorized entry to a system, network or IT resource, or unauthorized access to data for purposes of data exfiltration or other common APT activity;

2) identify a "source" or "origin" of the object (for example, a geographic location or enterprise/organization, website (e.g., URL) or device (e.g., IP address) from which communication packets constituting the object were sent, as identified, for example, in packet headers), which may or may not map to or be associated with sources of prior APT attacks or campaigns;

3) identify the location or identify a "destination" of the object (for example, a geographic location or enterprise/organization, website (e.g., URL) or device (e.g., IP address to which communication packets constituting the object were sent, as identified, for example, in packet headers), which may or may not map to or be associated with targets of prior APT attacks or campaigns;

4) indicate the object intends to make outbound communications during processing;

5) indicate the object intends to transmit host information;

6) indicate the object has prior knowledge about its destination, for example, details regarding financial records, personal information; and/or 7) indicate the object has an embedded object or will create or drop another object, process, or file, particular where the object, process or file is designed to takes advantage of non-public or not commonly known information of the destination.

The foregoing is not intended as a complete list of such potentially extracted features. APTs are becoming ever more sophisticated and evolving so that, currently or in the future, they may exhibit different types of features or different combinations of features. Accordingly, the present description is intended to provide a framework and guidance to allow those skilled in the art to practice the invention.

(C) An APT classifier compares the extracted features with features of objects in the APT database to determine whether the object constitutes an APT. The classifier may classify the object in response to determining that its extracted features include one or more APT related features (either when considered alone or in combination with other extracted features) having a predetermined level of correlation with one or more features of known APT objects in the APT database. The classification may also be based, at least on part, on correlation of the features (either alone or in combination) with features of known non-APT malware or known benign objects. The APT classifier may use the information stored in a local intelligence database, and/or may access a cloud-based APT database that may have information gathered from a number of APT detection centers.

(D) The APT classifier may use information concerning prior APT campaigns in making the classification of whether the object constitutes an APT. The APT classifier may also determine whether the current object is part of an on-going APT campaign based on its features having a correlation above a threshold with campaign information accessed in the intelligence database.

(E) Post-detection logic implemented within the APT detection center or separate from the APT detection center may be configured to (1) determining or updating APT attacker profiles, (2) determining or updating severity information regarding the APT attack represented by the object, (3) discovering or updating APT campaign trends, (4) making APT predictions based on APT trends, taking into account the APT object and information contained in the intelligence database, and (5) performing attribution of the APT object to its author or publisher. The post-detection logic may use the information in a local intelligence database, and/or may access (by a look-up in) a cloud-based database that may have information gathered from a number of APT detection centers.

(F) The APT classifier flagging the received object as an APT object in the intelligence database, and also recording in the intelligence database information regarding attacker profiles, severity, campaigns, trends, predictions, and attributions, if any.

(G) Reporting module issuing an alert or report on the newly discovered or confirmed APT and related information, as stored in the intelligence database.

In some embodiments, the malware detection system may be implemented separately from the APT detection system, and in others they may be integrated together at some level. When integrated, the system may determine whether the object is benign, malware or APT malware based on a single extraction/classification process.

What is claimed is:

1. A computerized method for discovering and identifying an advanced persistent threat (APT) object corresponding to an object that includes an APT being a type of malware that is directed at a particular target and seeks to surveil, extract or manipulate data to which the particular target would have access, comprising:

receiving an object to be classified by one or more virtual machines of an APT detection center, the APT detection center includes a server and the one or more virtual machines communicatively coupled to the server and configured for processing of the received object;

extracting features of the received object during processing of the received object by the one or more virtual machines, a first extracted feature of the extracted features includes information associated with an action performed during processing of the received object within the one or more virtual machines;

conducting, by the server, a first analysis by comparing the extracted features with features of known APT objects stored in an APT database accessible to the server;

responsive to determining that the extracted features satisfy a prescribed level of correlation with one or more features of known APT objects in the APT database, identifying the received object as an APT object in the APT database; and responsive to determining that the extracted features fail to satisfy the prescribed level of correlation with the one or more features of the known APT objects in the APT database, conducting a second analysis by the server subsequent to the first analysis, the second analysis includes a comparison of features associated with known non-APT malware to determine whether the received object is known non-APT type malware, the second analysis being different from the first analysis.

2. The computerized method of claim 1, wherein the conducting of the first analysis comprises correlating the extracted features of the received object with the features of known APT objects and the conducting of the second analysis comprises correlating the extracted features of the received object with features of known malware that differs from the known APT objects.

3. The computerized method of claim 1, wherein the extracted features of the received object satisfy a prescribed level of correlation when a predefined number of the extracted features match features of one or more known APT objects in the APT database.

4. The computerized method of claim 1, wherein the received object is a file suspected to contain malware code.

5. The computerized method of claim 4, wherein the extracted features are extracted before and after the malware code has been activated.

6. The computerized method of claim 1, wherein the received object includes a dropped object, the dropped object being (i) generated during processing of an object within the one or more virtual machines and (ii) returned to the one or more virtual machines for processing and extracting of the features of the dropped object.

7. The computerized method of claim 1, further comprising:
normalizing the extracted features of the received object such that each value in the extracted features is converted to a discrete or continuous value.

8. The computerized method of claim 1, further comprising:
transmitting a warning to a user of a client device that the received object is an APT object in response to determining that the extracted features of the received object satisfy a prescribed level of correlation, wherein the received object is received from a client device operated by the user.

9. The computerized method of claim 8, wherein the received object is received through an interface displayed on the client device and the warning is presented to the user through the interface.

10. The computerized method of claim 1, wherein the extracted features include data describing the behavior and characteristics of the received object that is received from a source external to the server.

11. The computerized method of claim 1, wherein the comparing of the extracted features with the features of the known APT objects in the APT database utilizes statistical and machine learning techniques to determine whether the extracted features of the received object satisfy the prescribed level of correlation to one or more of the known APT objects in the APT database.

12. The computerized method of claim 1, further comprising:
analyzing the APT database to, based on stored APT objects, determine the severity of the APT object.

13. The computerized method of claim 12, further comprising
analyzing stored APT objects within the APT database to rank the APT objects according to severity, the ranking of the severity of a first APT object of the stored APT objects is based on one or more of the size of a target and damage caused by the first APT object.

14. The computerized method of claim 13, furthering comprising:
comparing extracted features of the first APT object with extracted features of a second APT object; and
assigning the severity of the first object to the second object upon determining that the first APT object shares one or more features with the second APT object.

15. The computerized method of claim 12, wherein the analysis of the APT database comprises:
determining trends for APT attacks based on stored APT objects in the APT database; and
signaling a user of a possible future attack based on the determined trends.

16. The computerized method of claim 15, wherein the trends are determined relative to one or more of a time period and a target type.

17. The computerized method of claim 1, further comprising analyzing stored APT objects within the APT database and generating an attacker profile by
comparing extracted features of a first APT object stored in the APT database to extracted features of a second APT object stored in the APT database; and
associating the first APT object and the second APT object with an attacker profile upon determining that multiple APT objects share a predefined number of extracted features.

18. The computerized method of claim 17, further comprising:
comparing extracted features from a third APT object with one or more of the first APT object and the second APT object
associated with the attacker profile; and
attributing the third APT object to an attacker associated with the attacker profile upon determining that the third APT object shares the predefined number of extracted features with multiple APT objects.

19. The computerized method of claim 1 further comprising analyzing the APT database and identifying an APT campaign that comprises:
detecting a number of APT objects in the APT database that have occurred within a specified time period;
determining whether the number of APT objects detected during the specified time period is above a campaign threshold value; and
signaling that an APT campaign is occurring during the specified time period in response to determining that the number of APT objects during the specified time period is above the campaign threshold value.

20. The computerized method of claim 19, wherein the detected APT objects are associated with a single attacker.

21. The computerized method of claim 1, wherein the extracted features include data that exhibit that an associated attacker has prior knowledge about a target of the received object.

22. The computerized method of claim 1, wherein the extracting features of the received object is performed by a virtual machine during the processing of the object.

23. A non-transitory storage medium including instructions, when executed by one or more hardware processors, discovering and identifying a new advanced persistent threat (APT) object corresponding to an object that includes an APT being a type of malware that is directed at a particular target and seeks to surveil, extract or manipulate data to which the particular target would have access by performing a plurality of operations, comprising:
 extracting features of received object to be classified, the extracted features comprise at least a first extracted feature that includes information associated with an action performed during processing of the object;
 conducting a first analysis by comparing, by an APT classifier, the extracted features, including the first extracted feature, with features of known APT objects al-se that are stored in an APT database; and
 responsive to determining that the extracted features satisfy a prescribed level of correlation with one or more features of known APT objects, identifying the received object as an APT object in the APT database; and
 responsive to determining that the extracted features fail to satisfy the prescribed level of correlation with the one or more features of the known APT objects, conducting a second analysis by determining whether the received object is known malware or benign, the second analysis being different from the first analysis.

24. An advanced persistent threats (APT) detection center system for identifying and discovering a new APT being a type of malware that is directed at a particular target and seeks to surveil, extract or manipulate data to which the particular target would have access, comprising:
 one or more hardware processors;
 a memory including one or more software modules that, when executed by the one or more hardware processors:
  extract features, including APT related features, of a received object to be classified, the extracted features comprise at least a first extracted feature that includes information associated with an action performed during processing of the object;
  conduct a first analysis by comparing, by an APT classifier, the extracted features, including the first extracted feature, with features of known APT objects that are stored in an APT database;
  responsive to determining that the extracted features satisfy-a prescribed level of correlation with one or more features of known APT objects in the APT database, identify the received object as an APT object in the APT database; and
  responsive to determining that the extracted features fail to satisfy the prescribed level of correlation with the one or more features of the known APT objects in the APT database, conduct a second analysis by determining whether the received object is known malware or benign, the second analysis being different from the first analysis.

25. A computerized method for discovering and identifying a new advanced persistent threat (APT) being a type of malware that is directed at a particular target and seeks to surveil, extract or manipulate data to which the particular target would have access, comprising:
 determining one or more features associated with an object by one or more virtual machines of an APT detection center, the APT detection center includes a server and the one or more virtual machines that are configured for processing of the object, each of the one or more features describing a behavior of the object that is monitored during processing of the object;
 conducting a first analysis by the APT detection center in comparing the one or more features with features of objects in an APT database using an APT classifier;
 responsive to determining that the one or more features satisfy a prescribed level of correlation with features of a known APT object, identifying the object as an APT object in the APT database by the APT detection center; and
 responsive to determining that the one or more features fail to satisfy the prescribed level of correlation with the features of the known APT object, conducting by the APT detection center a second analysis by determining whether the received object is known malware or benign, the second analysis being different from the first analysis.

26. The computerized method of claim 25, wherein identifying the object as the APT object when a predefined number of the one or more features has the prescribed level of correlation with features of the known APT object in the APT database.

27. The computerized method of claim 25, wherein the one or more objects is a file suspected to contain malware.

28. The computerized method of claim 27, wherein the determining of the one or more features associated with the object comprises
 receiving the object to be classified;
 extracting the one or more features from the object;
 storing the object along with the one or more features in the APT database.

29. The computerized method of claim 28, further comprising:
 extracting a dropped object generated by the object;
 extracting one or more features describing behavior and characteristics of the dropped object; and
 associating the dropped object and the one or more extracted features of the dropped object with the object in the APT database.

30. The computerized method of claim 25, further comprising:
 normalizing the one or more features of the object so that each value in the one or more features is converted to a discrete or continuous value.

31. The computerized method of claim 25, further comprising:
 transmitting a warning message to a client device that the object is an APT object in response to determining that the one or more features of the object have the prescribed level of correlation with one or more features of known APT objects in the APT database.

32. The computerized method of claim 25, further comprising:
 analyzing the APT database, based on stored APT objects, to perform a plurality of (1) creating attacker profiles, (2) collecting evidence of an APT attack, (3) determining a level of severity of an APT object, (4) discovering and identifying overall APT campaigns, (5) performing attribution of the APT attack, and (6) predict future APT trends.

33. The computerized method of claim 25, further comprising:
    analyzing the APT database, based on stored APT objects, to discover and identifying overall APT campaigns.

34. The computerized method of claim 25, further comprising:
    analyzing the APT database, based on stored APT objects, to perform an attribution of the APT attack.

35. The computerized method of claim 25, further comprising:
    analyzing the APT database, based on stored APT objects, to predict future APT trends.

\* \* \* \* \*